US011682113B2

(12) United States Patent
Hyatt et al.

(10) Patent No.: US 11,682,113 B2
(45) Date of Patent: Jun. 20, 2023

(54) MULTI-CAMERA VISUAL INSPECTION APPLIANCE AND METHOD OF USE

(71) Applicant: INSPEKTO A.M.V. LTD., Ramat Gan (IL)

(72) Inventors: Yonatan Hyatt, Tel-Aviv (IL); Harel Boren, Givat Shmuel (IL); Alexander Spivak, Hadera (IL); Michael Gotlieb, Raanana (IL)

(73) Assignee: INSPEKTO A.M.V. LTD., Ramat Gan (IL)

( * ) Notice: Subject to any disclaimer, the term of this patent is extended or adjusted under 35 U.S.C. 154(b) by 0 days.

(21) Appl. No.: 17/298,606

(22) PCT Filed: Nov. 28, 2019

(86) PCT No.: PCT/IL2019/051303
§ 371 (c)(1),
(2) Date: May 31, 2021

(87) PCT Pub. No.: WO2020/110119
PCT Pub. Date: Jun. 4, 2020

(65) Prior Publication Data
US 2022/0005183 A1  Jan. 6, 2022

Related U.S. Application Data

(60) Provisional application No. 62/772,745, filed on Nov. 29, 2018.

(30) Foreign Application Priority Data

Nov. 29, 2018 (IL) .......................................... 263398

(51) Int. Cl.
*G06T 7/00* (2017.01)
*G06F 3/0482* (2013.01)
(Continued)

(52) U.S. Cl.
CPC .......... *G06T 7/0004* (2013.01); *G06F 3/0482* (2013.01); *H04N 5/262* (2013.01);
(Continued)

(58) Field of Classification Search
None
See application file for complete search history.

(56) References Cited

U.S. PATENT DOCUMENTS 6,661,931 B1 * 12/2003 Kawada .................... G06T 7/73
382/294
9,224,070 B1   12/2015 Sundareswara et al.
(Continued)

FOREIGN PATENT DOCUMENTS

KR    101688458       12/2016
WO    2016083897      6/2016
WO    2020110119 A1   6/2020

OTHER PUBLICATIONS

Park, et al., "Machine Learning-Based Imaging System for Surface Defect Inspection," International Journal of Precision Engineering and Manufacturing-Green Technology, Jul. 10, 2016, pp. 303-310, vol. 3, No. 3, Springer, New York, USA.
(Continued)

*Primary Examiner* — Heather R Jones
(74) *Attorney, Agent, or Firm* — Alphapatent Associates, Ltd; Daniel J. Swirsky

(57) ABSTRACT

An appliance for concurrent automated visual inspection of at least two items comprising: at least two inspection assemblies each comprising a camera assembly, wherein each one of the at least two items is inspected by one of the at least two Inspection assemblies; a controller in data communication with the at least two inspection assemblies, wherein the controller is a computing device, wherein the appliance is
(Continued)

adapted to be automatically configured for inspecting the at least two items using the at least two inspection assemblies.

14 Claims, 15 Drawing Sheets

(51) Int. Cl.
    *H04N 5/262* (2006.01)
    *H04N 7/18* (2006.01)
    *H04N 23/90* (2023.01)
    *H04N 23/695* (2023.01)

(52) U.S. Cl.
    CPC ........... *H04N 7/181* (2013.01); *H04N 23/695* (2023.01); *H04N 23/90* (2023.01); *G06T 2200/24* (2013.01); *G06T 2207/20092* (2013.01); *G06T 2207/20221* (2013.01); *G06T 2207/30108* (2013.01); *G06T 2207/30244* (2013.01)

(56) References Cited

U.S. PATENT DOCUMENTS

| | | |
|---|---|---|
| 2002/0180960 A1* | 12/2002 | Koren ................ G01N 21/8803 356/237.2 |
| 2003/0182251 A1 | 9/2003 | Kim et al. |
| 2004/0030436 A1* | 2/2004 | Popp ..................... G06T 7/0004 700/109 |
| 2010/0215246 A1 | 8/2010 | Albeck et al. |
| 2012/0128230 A1 | 5/2012 | Meada |
| 2012/0154607 A1 | 6/2012 | Moed et al. |
| 2012/0155741 A1 | 6/2012 | Shibuya |
| 2013/0202200 A1 | 8/2013 | Evan |
| 2015/0064813 A1 | 3/2015 | Ayotte |
| 2015/0131116 A1 | 5/2015 | Sochi |
| 2015/0362908 A1* | 12/2015 | Lee .................. G05B 19/41875 700/110 |
| 2017/0103508 A1 | 4/2017 | Chang et al. |
| 2018/0276811 A1 | 9/2018 | Wen et al. |

OTHER PUBLICATIONS

Natsagdorj et al. Vision-based assembly and inspection system for golf club heads, Robotics and Integrated Manufacturing, Apr. 2015, pp. 83-92, vol. 32, Elsevier Ltd., Amsterdam, Netherlands.

* cited by examiner

MULTI-CAMERA VISUAL INSPECTION APPLIANCE AND METHOD OF USE

FIELD

The present disclosure relates to visual inspection of items on a production line and more specifically to an inspection appliance comprising multiple inspection cameras.

BACKGROUND

Inspection during production processes helps control the quality of products by identifying defects and then acting upon this detection, for example, by fixing the defect or discarding the defective part. The process of defect detection is essential for quality assurance (QA), gating, and sorting on production lines, and is consequently useful in improving productivity, improving production processes and working procedures, reducing defect rates, and reducing re-work and waste.

Automated visual inspection methods are used in production lines to identify visually detectable anomalies that may have a functional or aesthetic impact on a manufactured part. Due to the underlying technologies that drive them, current visual inspection solutions for production lines are: (1) typically highly customized to a particular product and the particular QA, gating, or sorting task that is addressed; (2) very expensive; (3) very time consuming to set up; (4) require expert selection and integration of hardware, cameras, lighting and software components; and (5) require expert maintenance of these throughout the lifetime of the inspection solution and the production line. The planning, design, installation, customization and maintenance are generally performed by a system integrator—which may be an external or internal entity.

The highly time-consuming aspects of setting up a QA, gating or sorting apparatus include: (1) meticulous planning, selection, and thereafter positioning of the inspection camera such that its field of view includes the item or area for inspection; (2) meticulous planning, installing and testing of the items or area for inspection such that objects are presented to the inspection camera in a repetitive manner; and (3) careful planning and positioning of the light source, or sources, so as to adequately light the item or area for inspection, in a way best serving the particular case and preventing any unwanted reflections. Further, components such as cameras and lighting require still further fine-positioning as their positions affect one another. Still further, the mounting systems for both camera and lighting, as well as the holding or transport mechanism for the object being inspected are generally tailor-made for the specific situation and tightly fixed in position as slight changes may render the system unusable.

As a result of the intensive costs, human resources, and sheer time requirements, that are associated with tailoring inspection solutions as described above, manufacturing plants are able to deploy only a limited number of such systems. The limited number of inspection solutions is clearly at odds with the need of modern manufacturing plants where it would be preferable to have multiple inspection systems. Examples of productions line situations where a single inspection solution is clearly insufficient include:

Production of two or more identical items—such as where products are produced on parallel production lines as part of the same batch. In such a situation it would not be possible to simply duplicate an existing inspection solution since the second inspection solution would also have to be designed and tailored for operation in its specific environment with no benefit gained from the existing inspection solution;

Production of items where each item requires inspection from multiple angles to cover different sides, angles or aspects of the item. In this case a unique inspection solution needs to be created for each product angle/aspect to be inspected;

Production of two or more or unique items simultaneously—such as where these items are produced in the same mold or using the same production tool. Here too a unique inspection solution needs to be created for each item produced;

Production of items that require inspection at several stages during production—such as each stage of product assembly. Here too a unique inspection solution needs to be created for each product stage to be inspected.

In each of the above cases there are common attributes shared by the inspection systems, however the logic of operation is different. For example, for the use case where different angles are inspected, a single defect seen from one of the angles affects the entire item. By contrast, for parallel production lines, although the inspection systems are inspecting the same items, a defect on an item on one of the production lines does not affect other products on the other line. Further, in the latter two cases it would therefore be desirable to correlate results from multiple inspection systems. Therefore, in cases such as these there could be advantages in operating multiple inspection systems and benefiting from the interworking of these systems. However, as described above, current visual inspection systems need to be specifically tailored and integrated and are therefore too complex and expensive to deploy in such situations. Indeed, these scenarios may even further complicate deployment—for example, two inspection systems placed close together will each affect the other's lighting requirements resulting in a doubly complex integration.

The result is that manufacturing plants must supplement these limited inspection solutions with an expensive internal/external human workforce to perform quality assurance (QA), gating, sorting or other tasks, instead of utilizing staff to augment productivity, quality, and safety, or improving capital efficiency and pricing for end-customers. Alternatively, the plant is left with no other option but to skip inspection of items and run the risk of decreased quality resulting in potential loss of reputation and even financial claims against the plant for inferior products.

SUMMARY

The present disclosure overcomes the drawbacks of the prior art by providing an automated visual inspection system that is able to simultaneously inspect multiple items or different aspects or stages of the same item with the ability to correlate concurrent or sequential inspection results but without requiring extensive setup and customization.

Embodiments of the invention provide an automated visual inspection appliance for a production line comprising multiple cameras that can simultaneously inspect multiple items or different aspects or stages of the same item while correlating concurrent or sequential inspection results. Ease of deployment and operation is enabled by a combination of machine learning, computer vision, and other algorithms that dynamically adapt to assess the item to be inspected, the target area of inspection, and the characteristics of the surrounding environment (such as but not limited to lighting) effecting the inspection setup.

In some embodiments the system is provided as an appliance comprising multiple inspection assemblies connected to a controller. Each inspection assembly comprises a customizable mounting assembly, and a camera assembly which comprises an inspection camera and light source. The inspection cameras and lighting sources from each inspection assembly are controlled by the controller. The use of a single controller operating multiple inspection assemblies enables concurrent inspection of multiple items, for example, where each item is inspected using one of the inspection assemblies and individual results are provided per item. This configuration provides both cost and space savings as only a single controller is needed for multiple inspection assemblies.

Further, the use of a single controller operating multiple inspection assemblies enables sharing of item profiles (that include the data needed to inspect an item) between inspection assemblies and also correlation of results from the multiple inspection assemblies. The controller preferably handles several multi-inspection assembly configurations based on the relationship between the items to be inspected including:

Inspecting multiple identical items concurrently where each item is inspected using one of the inspection assemblies and individual results are provided per item;

Inspecting an item simultaneously from different points of view with multiple inspection assemblies and correlating the results from all of the inspection assemblies;

Inspecting multiple different items concurrently where each item is inspected using one of the inspection assemblies and individual results are provided per item—optionally where the items are produced simultaneously from the same production process; and Inspecting multiple stages of a production of an item where each stage is inspected by one of the inspection assemblies where individual results are provided per item per stage and correlated results are provided across multiple stages.

In preferred embodiments the multi-inspection assembly appliance optionally combined with a software "wizard" running on the controller enables fast setup of the controller for the particular configuration of the production environment without the need for significant integration efforts or specialized expertise.

In use, defect free embodiments of items to be inspected are first processed in a setup stage where the controller learns parameters of the items as captured in images by one or more of the inspection assemblies. In a preferred embodiment no database of defects is used (such as in most prior art systems), only defect-free items are analyzed during the setup stage. Once setup is completed, these parameters are consolidated into a profile stored on the controller describing each item. Multiple profiles describing multiple items are thus created. Prior to inspection, the appropriate profile is selected for the item to be inspected. Items to be inspected preferably comprise any item type, shape or material, set in any lighting environment.

In a further setup stage the inspection configuration is selected for use from the preconfigured list.

In the inspection stage, inspected items, (manufactured items that are to be inspected for defects or for gating or sorting or counting purposes), are imaged and the image data collected by the inspection assemblies is processed by the controller. The controller uses machine learning algorithms which preferably provide human-level analysis of defects in inspection images even with differing illumination conditions, different reflections, shading, varying location, shape tolerances, etc. The results of inspection are provided according to the inspection configuration in use.

According to the teachings of the present disclosure an appliance for concurrent automated visual inspection of at least two items comprises: at least two inspection assemblies each comprising a camera assembly, wherein each one of the at least two items is inspected by one of the at least two inspection assemblies; a controller in data communication with the at least two inspection assemblies, wherein the controller is a computing device, wherein the appliance is adapted to be automatically configured for inspecting the at least two items using the at least two inspection assemblies. Preferably the automatic configuration is performed according to an input from a user, wherein the input describes a relationship between the at least two items.

Optionally the relationship between the at least two items is at least one of: the at least two items are identical and produced concurrently; the at least two items are different aspects of the same item; the at least two items are different from each other but are produced as part of the same production process; the at least two items are different stages in the manufacture of an item; or the at least two items are produced concurrently. Preferably the controller comprises a UI and the input is provided via the UI of the controller. Optionally the UI provides a list of the relationships and the input comprises selecting a relationship from the list using a selection mechanism.

Optionally the selection mechanism is chosen from the group consisting of: selecting from a drop-down list of the relationships; checking a check box next to one of the relationships; and selecting a button from a list of buttons wherein each button represents one of the relationships.

Optionally when the at least two items are identical and produced concurrently, the automatic configuration comprises loading a single item profile and providing individual results for each item. Optionally when the at least two items are different aspects of the same item the automatic configuration comprises loading item profiles for each aspect and providing both of individual results for each item and a correlated result for all items. Optionally when the at least two items are different from each other but are produced as part of the same production process, the automatic configuration comprises loading multiple item profile each corresponding to an item and providing individual results for each item.

Optionally when the at least two items are different stages in the manufacture of an item, the automatic configuration comprises loading item profiles for each stage and providing both of individual results for each item and a correlated result for all stages of an item. Optionally when the at least two items are produced concurrently, the automatic configuration comprises loading item profiles for each item and providing individual results for each item. Optionally images related to the individual results for an item are stored and linked so as to be retrievable as a correlated set of images.

According to further teachings of the present disclosure there is provided a method for concurrent automated visual inspection of at least two items comprising: providing an inspection appliance comprising: at least two inspection assemblies each comprising a camera assembly, wherein each one of the at least two items is inspected by one of the at least two inspection assemblies; and a controller in data communication with the at least two inspection assemblies, wherein the controller is a computing device, providing an input from a user to the controller, wherein the input describes the relationship between the at least two items; and automatically configuring the appliance for inspecting the at least two items.

Optionally the relationship between the at least two items is at least one of: the at least two items are identical and produced concurrently; the at least two items are different aspects of the same item; the at least two items are different from each other but are produced as part of the same production process; the at least two items are different stages in the manufacture of an item; or the at least two items are produced concurrently. Preferably the controller comprises a UI and the input is provided via the UI of the controller. Optionally the UI provides a list of the relationships and the input comprises selecting a relationship from the list using a selection mechanism. Optionally the selection mechanism is chosen from the group consisting of: selecting from a drop-down list of the relationships; checking a check box next to one of the relationships; and selecting a button from a list of buttons wherein each button represents one of the relationships.

Optionally when the at least two items are identical and produced concurrently, the automatic configuration comprises loading a single item profile and providing individual results for each item. Optionally when the at least two items are different aspects of the same item the automatic configuration comprises loading item profiles for each aspect and providing both of individual results for each item and a correlated result for all items. Optionally when the at least two items are different from each other but are produced as part of the same production process, the automatic configuration comprises loading multiple item profile each corresponding to an item and providing individual results for each item. Optionally when the at least two items are different stages in the manufacture of an item, the automatic configuration comprises loading item profiles for each stage and providing both of individual results for each item and a correlated result for all stages of an item. Optionally when the at least two items are produced concurrently, the automatic configuration comprises loading item profiles for each item and providing individual results for each item. Optionally images related to the individual results for an item are stored and linked so as to be retrievable as a correlated set of images.

According to further teachings of the present disclosure an appliance for concurrent automated visual inspection of at least two items comprises: at least two camera assemblies mounted on at least one mounting assembly, wherein each one of the at least two items is inspected by one of the at least two camera assemblies; a controller in data communication with the at least two camera assemblies, wherein the controller is a computing device, wherein the appliance is adapted to be automatically configured for inspecting the at least two items using the at least two camera assemblies. Preferably the automatic configuration is performed according to an input from a user, wherein the input describes a relationship between the at least two items.

Optionally the relationship between the at least two items is at least one of: the at least two items are identical and produced concurrently; the at least two items are different aspects of the same item; the at least two items are different from each other but are part of the same production process; the at least two items are different stages in the manufacture of an item; or the at least two items are produced concurrently.

Optionally the appliance further comprises sensors mounted between the camera assemblies, wherein the sensors are adapted to detect the positions and angles between the camera assemblies relative to one another and for outputting the detected positions and angles to the controller. Optionally the controller comprises a user interface (UI) and the controller is adapted for using the detected positions and angles to guide the positioning of the captured fields of view based on the relative positions of the camera assemblies for display on the UI.

According to further teachings of the present disclosure an appliance for concurrent automated visual inspection of an item comprises: at least two camera assemblies mounted on at least one mounting assembly, wherein each one of the at least two camera assemblies captures adjacent or overlapping fields of view of the item; a controller in data communication with the at least two camera assemblies, wherein the controller is a computing device, wherein the appliance is adapted to be automatically configured for inspecting the item using the at least two camera assemblies. Preferably the appliance further comprises sensors mounted between the camera assemblies, wherein the sensors are adapted to detect the positions and angles between the camera assemblies relative to one another and for outputting the detected positions and angles to the controller.

Optionally the controller comprises a user interface (UI) and the controller is adapted for using the detected positions and angles to guide the positioning of the captured fields of view based on the relative positions of the camera assemblies for display on the UI. Optionally the controller is adapted for using the detected positions and angles to guide the stitching together of the captured fields of view into a single combined field of view based on the relative positions of the camera assemblies for display on the UI.

As used herein the term "item" refers to a production item wherein production items may be different production stages of the same product or may be different products or different production stages of different products or the same item inspected from different angles. Items may be of any type, shape, size, material, or any other attribute and no example herein should be considered limiting.

As used herein, the term "defect" may include, for example, a visible flaw on the surface of an item, an undesirable size, shape or color of the item or of parts of the item, an undesirable number of parts of the item, a wrong or missing assembly of its interfaces, a broken or burned part, an incorrect alignment of an item or parts of an item, and in general, any difference between a defect free sample and the inspected item. Optionally or additionally a defect is a difference which would be evident to a human user between a defect free item (and/or group of defect free items) and a same-type inspected item.

The processes described below refer, for simplicity, to "images", however it should be appreciated that the processes described herein may be carried out on image data other than or in addition to full images. The term "images" also includes video captured by the cameras of the presently described system.

As used herein "simultaneous" inspection by individual inspection assemblies implies that the inspection assemblies are performing inspection concurrently or alternatively that the controller recognizes that the same items have been placed in view of the inspection assemblies and synchronizes the inspection results or alternatively that the inspection assemblies are synchronized and capturing images at the same time.

While the description below assumes that the setup stages and inspection stages take place on the same inspection line, it should be noted that the inspection profile includes setup parameters (e.g., distance of the item from the camera and/or location of the item within the field of view) and the inspection may therefore take place in a separate location with a separate inspection system, or with the same inspection system remounted in a different place and/or production line.

The term "product stage" as used herein should be understood to include any of an assembly stage (items are assembled into a product), manufacturing stage (items are subjected to a form of processing as part of product manufacture), and/or inspection stage (stages are actually different views or sections of the same product). As used herein product stages are related to one another by their being production stages or aspects of a product. The term item may be used to refer to a product stage. As used herein a "product" may refer to a completed commercial product but may also refer to a manufactured item or part that is destined for integration into a product.

Inspection of items as described herein should also be understood as inspection for purposes of defect detection, gating, counting and/or sorting. Where one of these terms is used e.g.: "defect detection" this should be understood as referring to any one of defect detection, gating, counting, or sorting.

Unless otherwise defined, all technical and scientific terms used herein have the same meaning as commonly understood by one of ordinary skill in the art to which this disclosure belongs. The materials, methods, and examples provided herein are illustrative only and not intended to be limiting.

Implementation of the method and system of the present disclosure involves performing or completing certain selected tasks or steps manually, automatically, or a combination thereof. Moreover, according to actual instrumentation and equipment of preferred embodiments of the method and system of the present disclosure, several selected steps could be implemented by hardware or by software on any operating system of any firmware or a combination thereof. For example, as hardware, selected steps of the disclosure could be implemented as a chip or a circuit. As software, selected steps of the disclosure could be implemented as a plurality of software instructions being executed by a computer using any suitable operating system. In any case, selected steps of the method and system of the disclosure could be described as being performed by a data processor, such as a computing device for executing a plurality of instructions.

Unless specifically stated otherwise, as apparent from the following discussions, it is appreciated that throughout the specification discussions utilizing terms such as "analyzing", "processing," "computing," "calculating," "determining," "detecting", "identifying" or the like, refer to the action and/or processes of a computer, or similar electronic computing device as defined below, that manipulates and/or transforms data represented as physical, such as electronic, quantities within the computing system's registers and/or memories into other data similarly represented as physical quantities within the computing system's memories, registers or other such information storage, transmission or display devices. Unless otherwise stated, these terms refer to automatic action of a processor, independent of and without any actions of a human operator.

As used herein the terms "machine learning" or "artificial intelligence" refer to use of algorithms on a computing device that parse data, learn from this data, and then make a determination, where the determination is not deterministically replicable (such as with deterministically oriented software as known in the art).

Although the present disclosure is described with regard to a "computing device", a "computer", or "mobile device", it should be noted that optionally any device featuring a data processor and the ability to execute one or more instructions may be described as a computer, including but not limited to any type of personal computer (PC), a server, a distributed server, a virtual server, a cloud computing platform, a cellular telephone, an IP telephone, a smartphone, or a PDA (personal digital assistant). Any two or more of such devices in communication with each other may optionally comprise a "network" or a "computer network".

BRIEF DESCRIPTION OF THE DRAWINGS

The disclosure will now be described in relation to certain examples and embodiments with reference to the following illustrative drawing so that it may be more fully understood. In the drawings.

DETAILED DESCRIPTION

The present disclosure in at least some embodiments is a multi-camera automated visual inspection appliance for a production line that can correlate views from the multiple cameras or simultaneously inspect multiple items without significant tailored integration.

Figure 1A:
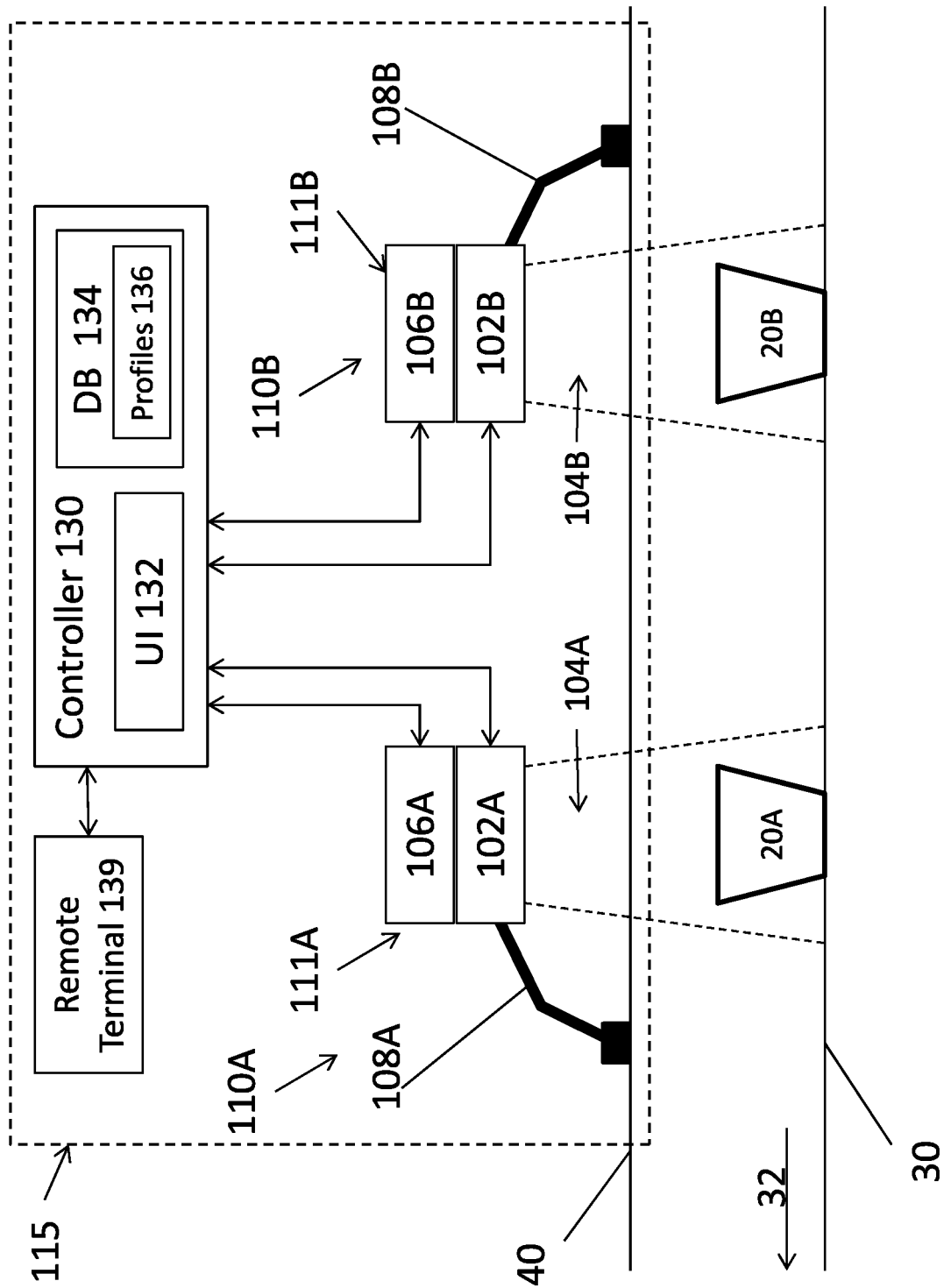
FIGS. 1A-1B are illustrative schematic drawings showing a multi-inspection assembly automated visual inspection appliance on a production line according to at least some embodiments of the present disclosure.
Figure 1B:
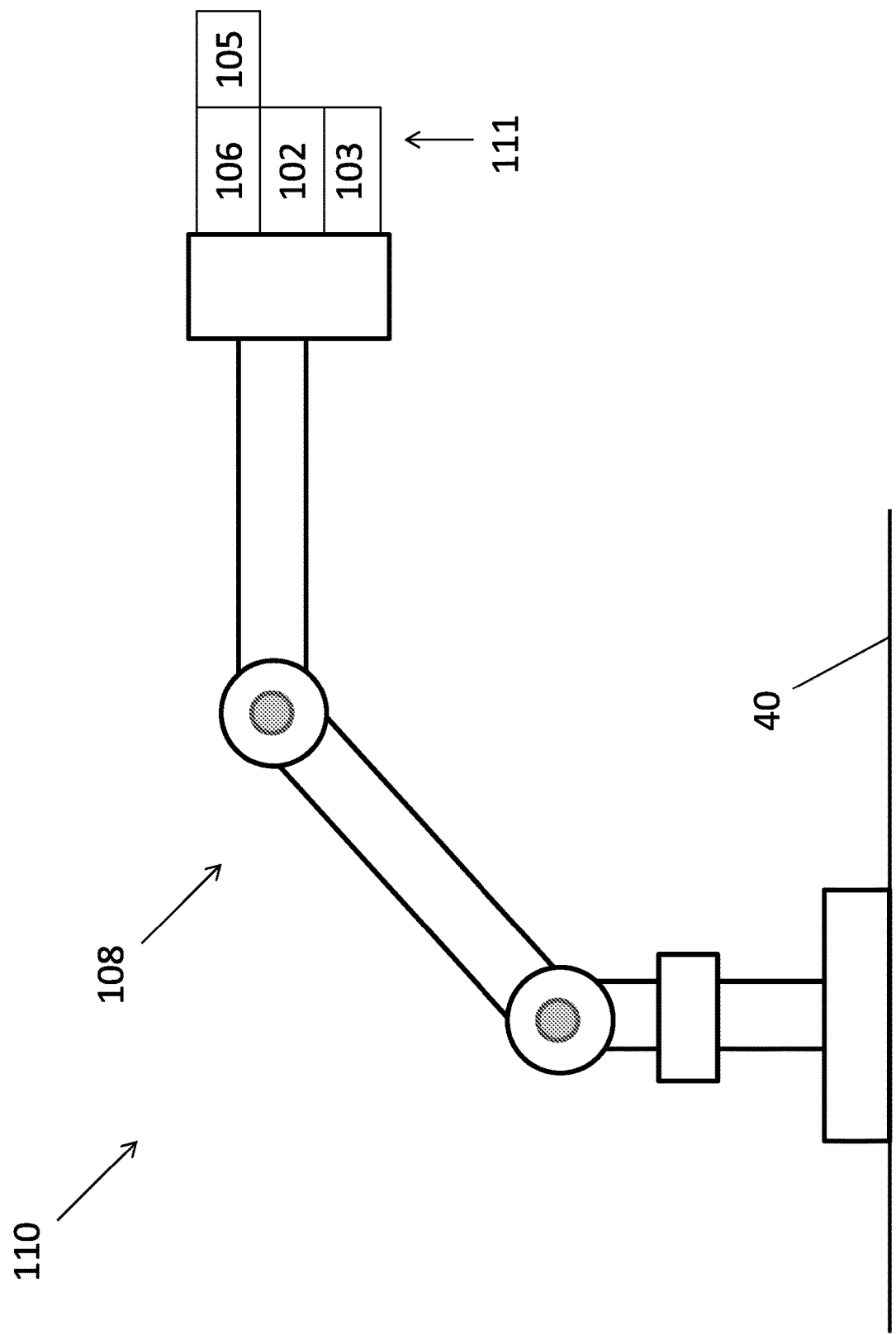

Reference is now made to FIGS. 1A-1B which are illustrative schematic drawings showing a multi-inspection assembly automated visual inspection appliance on a production line according to at least some embodiments of the present disclosure. As shown in FIGS. 1A and 1B an automated multi-camera visual inspection system 115 comprises controller 130, and a plurality of inspection assemblies 110. Controller 130 can define a configuration (as further described below) for each of the inspection assemblies 110.

In one embodiment, each inspection assembly includes a processor to locally analyze images (as further described herein) obtained at the inspection assembly. Results of the local analysis can be transmitted to controller 130, e.g., for further processing and display by controller 130.

In other embodiments analysis of images obtained at inspection assemblies 110 can be done at controller 130.

Controller 130 may be locally connected to the plurality of inspection assemblies 110 or may be remotely connected, e.g., via the cloud.

Each inspection assembly 110 comprises mounting assembly 108 and camera assembly 111. Camera assembly 111 comprises camera 102, and light source 106. The embodiment of FIG. 1A shows two inspection assemblies but this should not be considered limiting and optionally any number of inspection assemblies 110 could be provided.

Camera 102 comprises a CCD or CMOS or other appropriate imaging chip. Camera 102 is a 2D camera or optionally a 3D camera. Optionally camera 102 comprises the camera integrated into a mobile device such as a smartphone or tablet where the device is attached to mounting assembly 108. Camera 102 comprises a lens 103 placed over the lens of camera 102 or directly over the imaging chip of camera 102. Lens 103 is any suitable lens including but not limited to: polarizing lens, tele-centric lens, narrow band, zoom lens, or other lens.

Light source 106 comprises LEDs or other known light source. The intensity (brightness) of light source 106 can be adjusted. Optionally, the color of light source 106 can be adjusted. Optionally, light source 106 comprises multiple controllable segments, each of which can be activated or provided with the same or different intensity and/or color. For example, but without intention to be limiting, light source 106 may comprise a circular array of LEDs surrounding camera 102 lens, where radial portions of circular light source 106 are controlled individually or alternatively the intensity and/or color of every LED or groupings of LEDs, can be controlled individually. Light source 106 optionally comprises a diffuser 105.

Light source 106 is shown as positioned above camera 102 for simplicity of the figures but this position should not be considered limiting. Optionally, light source 106 is mounted on the side of or below camera 102. Light source 106 is preferably attached to and surrounds or is otherwise fixed in relation to the lens of camera 102 so as to illuminate the field of view (FOV) 104 of camera 102 or portions thereof, wherein the illuminated portions are illuminated contiguously or separately. Where reference is made to FOV 104 herein it is to be understood that light source 106 is positioned to illuminate FOV 104. In some embodiments camera assembly 111 is attached to mounting assembly 108. Alternatively, camera 102 and light source 106 are separately attached to mounting assembly 108 allowing individual adjustment of either.

Mounting assembly 108 comprises mounts, segments and fasteners allowing adaptation and adjustment of mounting assembly 108 for optimal positioning of camera 102 and light source 106.

Camera assembly 111 is positioned using mounting assembly 108 such that items 20 to be inspected are within FOV 104 of camera 102. In some embodiments mounting assembly 108 is attached to a mounting surface 40. Surface 40 optionally comprises an aluminum profile including grooves for attachment of mounting assembly 108. Surface 40 may remain in a fixed position relative to item 20 or alternatively may move so as to repeatedly bring camera assembly 111 into a position where items 20 to be inspected are within the field of view 104 of camera 102. A non-limiting example of a moving surface 40 is a robot arm. Alternatively, items 20 to be inspected may be placed on an inspection line 30 which comprises means for supporting and moving items 20 such as but not limited to a conveyer belt, or a cradle or another holding apparatus, moving in direction 32 while camera assembly 111 remains stationary, such that first item 20 is brought into FOV 104 followed by second item 20 which is brought into FOV 104, and so forth. Alternatively, items 20 are successively placed in FOV 104 and then removed such as by a robot or human operator. Although the embodiments herein are shown as being on a horizontal conveyor moving indirection 32 this should not be considered limiting and optionally any of the options for surface 40 and inspection line 30 may be implemented.

Camera 102 and light source 106 are in communication with controller 130. Typically, controller 130 is a computing device as defined herein and is adapted to perform the functions and steps as described herein by comprising software and hardware. Controller 130 comprises one or more processors (not shown) such as but not limited to a central processing unit (CPU), a graphics processing unit (GPU), FPGA, a digital signal processor (DSP), a microprocessor, a controller, a chip, a microchip, an integrated circuit (IC), or any other suitable multi-purpose or specific processor or controller. Controller 130 activates camera 102 and light source 106 or any of camera assembly 111 components or controllable segments as described above, which may or may not be activated depending on the item being imaged or the inspection lighting environment. Controller 130 is preferably adapted to support multiple inspection assemblies such as by comprising additional RANI and/or faster processors and/or additional communication ports compared to a controller adapted to support only one inspection assembly.

Controller 130 preferably alters the intensity or color of light source 106 depending on the item being imaged or the inspection lighting environment. Controller 130 preferably alters the intensity or color of light source 106 for regions of particular interest within the illuminated area. Controller 130 preferably alters the intensity or color of light source 106 so that images taken by camera 102 of item 20 are not over or under exposed. Controller 130 preferably rotates lens 103 such as when lens 103 is rotatable such as when lens 103 is a polarizing lens and the polarizing lens is adjusted to minimize reflections from item 20. Controller 130 preferably controls camera 102 parameters including but not limited to focus, white balance, exposure, zoom, any camera mechanical options and any other adjustable parameters of camera 102.

Controller 130 further comprises a memory unit (not shown) which stores executable instructions that, when executed by the processor, facilitate performance of operations of the processor. The memory unit may also store at least part of the image data received from camera 102. Non-limiting examples of memory units include random access memory (RAM), dynamic RANI (DRAM), flash memory, volatile memory, non-volatile memory, cache memory, a buffer, a short term memory unit, a long term memory unit, or other suitable memory units or storage units. Controller 130 comprises item profiles 136 which are stored in DB 134.

Controller 130 further comprises a user interface (UI) 132. UI 132 may comprise a monitor or screen and notifications to a user may be visual (e.g., text or other content displayed on the monitor). Alternatively or additionally, UI 132 comprises a light that may light up or change color. Alternatively or additionally, UI 132 comprises an audio player to emit a sound. UI 132 preferably comprises means for accepting user input such as a touch screen, keyboard and/or mouse. Optionally, UI 132 is provided on a multi-purpose device such as a smartphone, tablet or personal computer.

System 115 optionally comprises a remote terminal 139 for remote manipulation of controller 130. Remote terminal 139 is optionally a web browser and provides a web service for control of controller 130 including access to UI 132. In some embodiments controller 130 may be part of remote terminal 139, e.g., in the cloud. All or some of the components of system 115 may be in wired or wireless communication.

FIG. 1A shows two inspection assemblies 110A and 110B each positioned to inspect items 20A and 20B respectively. In use, multiple different configurations for multi-camera system 115 are contemplated as described with reference to FIGS. 2-5. The embodiments of FIGS. 2-5 optionally each comprise a single mounting arm 108 holding multiple camera assemblies 111 (where the number of camera assemblies 111 is equal to the number of inspection assemblies 110 shown in each figure, as shown, for example, in FIGS. 7B and 7C).

Figure 2:
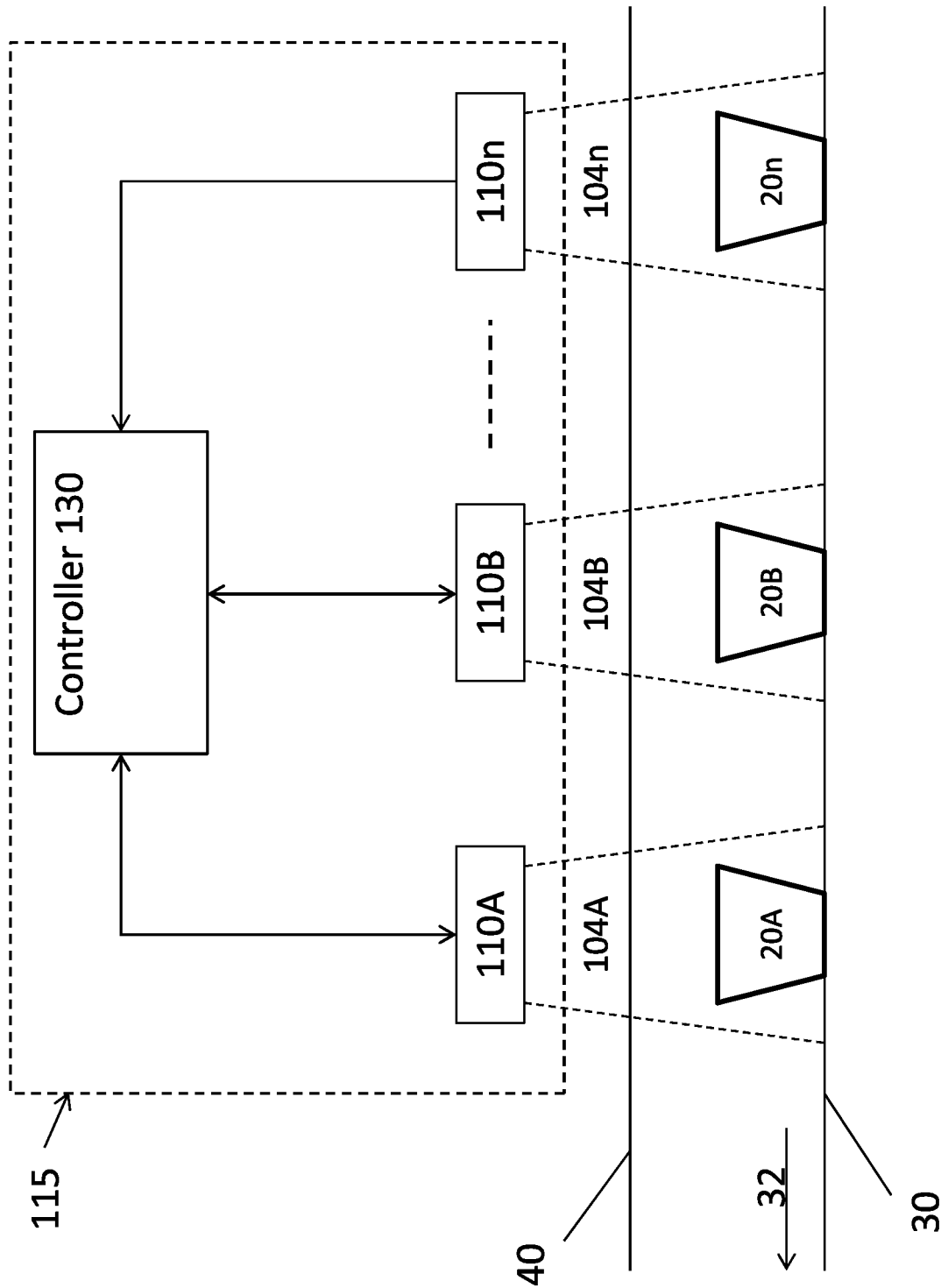
FIG. 2 is an illustrative schematic drawing showing a multi-inspection assembly automated visual inspection appliance on a production line according to at least some embodiments of the present disclosure.

Reference is now made to FIG. 2 which is an illustrative schematic drawing showing a multi-camera automated visual inspection appliance on a production line according to at least some embodiments of the present disclosure. As shown in FIG. 2 multiple inspection assemblies 110 are positioned where the respective fields of view 104 include items 20 so as to inspect multiple items 20. In the embodiment of FIG. 2, the production process produces three identical items 20A, 20B and 20n simultaneously. Three inspection assemblies 110A, 110B, and 110n are shown for simultaneously imaging identical items 20A, 20B and 20n such that controller 130 can simultaneously provide separate inspection results for each of items 20A, 20B and 20n. Although three items 20A, 20B and 20n, and three inspection assemblies 110A, 110B and 110n are shown it should be appreciated that any number of inspection assemblies 110 may be provided for simultaneous individual inspection of a corresponding number of identical items 20. Items 20A, 20B and 20n preferably have shared attributes such as but not limited to: belonging to the same batch; being produced on the same production line; being produced by the same production tool; having the same part name/ID.

Figure 3:
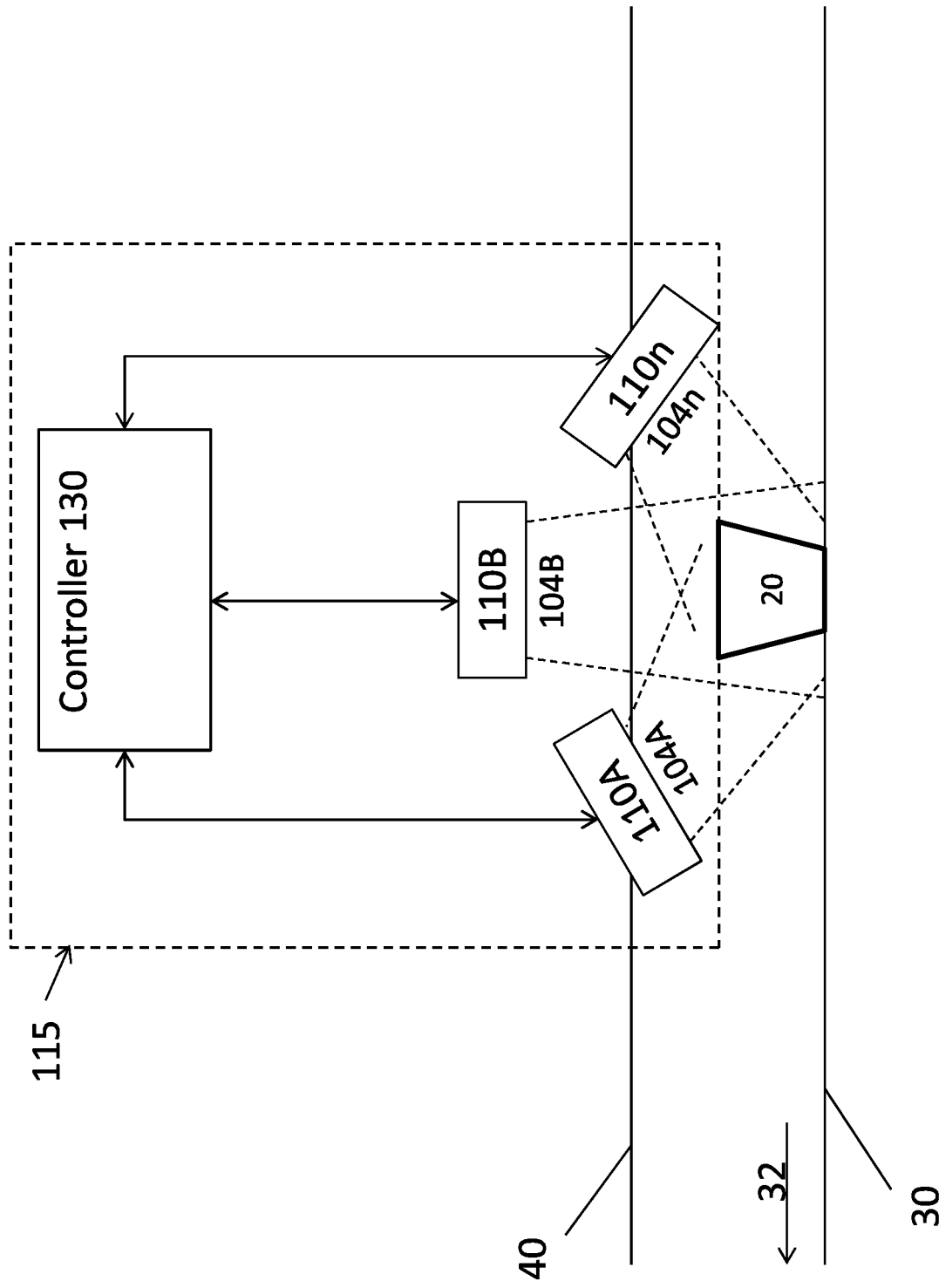
FIG. 3 is an illustrative schematic drawing showing a multi-inspection assembly automated visual inspection appliance on a production line according to at least some embodiments of the present disclosure.

Reference is now made to FIG. 3 which is an illustrative schematic drawing showing a multi-camera automated visual inspection appliance on a production line according to at least some embodiments of the present disclosure. As shown in FIG. 3 multiple inspection assemblies 110 are positioned where the respective fields of view 104 include different aspects of item 20. "Aspects" of an item as used herein refers to different sides, surfaces, angles, sections, or parts of item 20. Three inspection assemblies 110A, 110B, and 110n are shown for simultaneously imaging different aspects of item 20 such that controller 130 can provide a combined inspection result for item 20 taking into account each of the inspection results for each aspect of item 20. Although three inspection assemblies 110A, 110B and 110n are shown it should be appreciated that optionally any number of inspection assemblies 110 may be provided for inspection of a corresponding number of different aspects of item 20.

Figure 4:
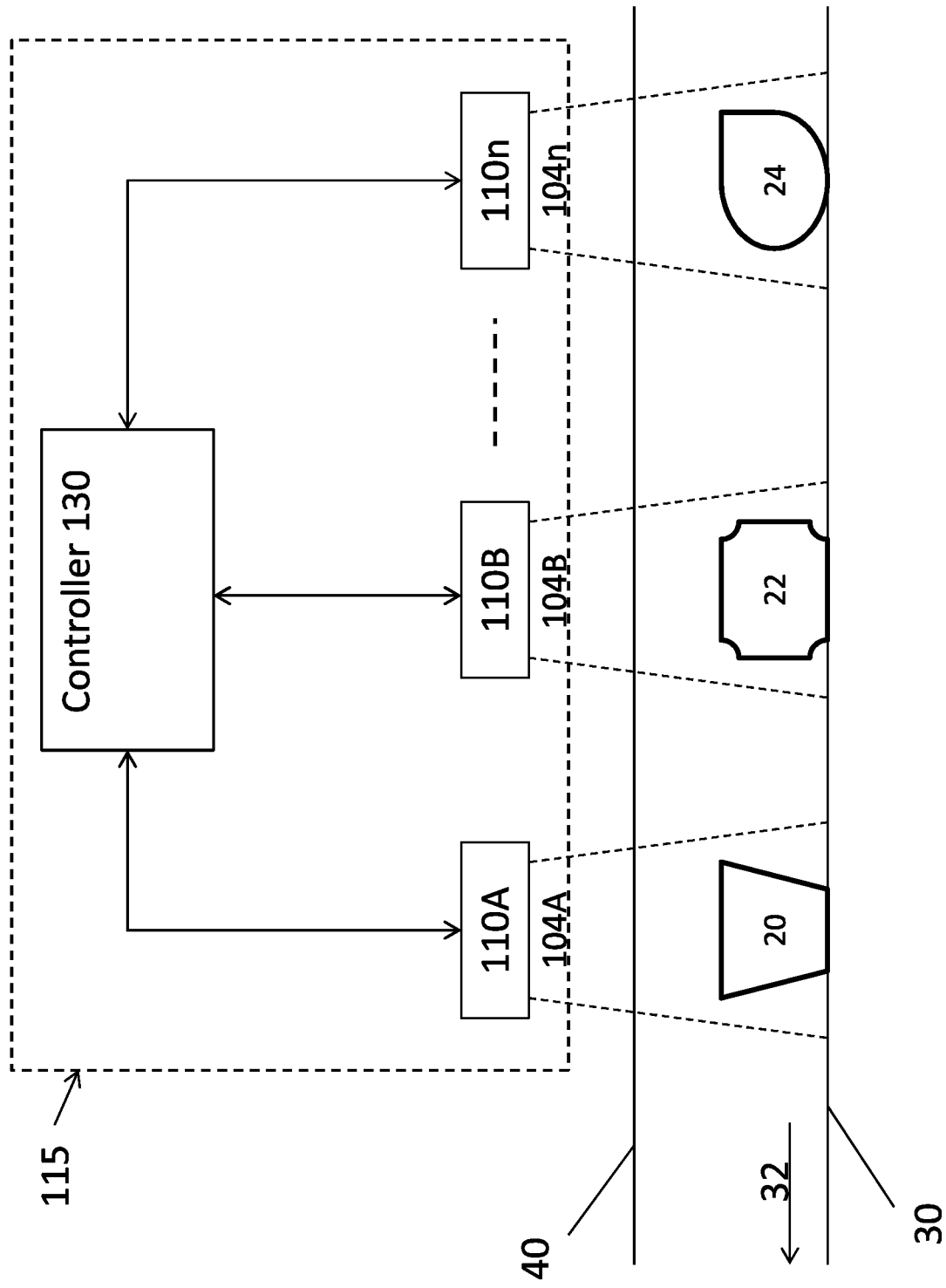
FIG. 4 is an illustrative schematic drawing showing a multi-inspection assembly automated visual inspection appliance on a production line according to at least some embodiments of the present disclosure.

Reference is now made to FIG. 4 which is an illustrative schematic drawing showing a multi-camera automated visual inspection appliance on a production line according to at least some embodiments of the present disclosure. As shown in FIG. 4, multiple inspection assemblies 110A, 110B and 110n are positioned where their respective fields of view 104A, 104B and 104n include, respectively, items 20, 22, and 24 to enable inspection of items 20, 22 and 24. In the embodiment of FIG. 4, the production process produces items 20, 22 and 24 simultaneously and items 20, 22 and 24 are different items. Three inspection assemblies 110A, 110B, and 110n are shown for simultaneously imaging items 20, 22 and 24 such that controller 130 can simultaneously provide inspection results for each of items 20, 22 and 24. Although three items 20, 22 and 24, and three inspection assemblies 110A, 110B and 110n are shown it should be appreciated that optionally any number of inspection assemblies 110 may be provided for simultaneous inspection of a corresponding number of different items.

Figure 5:
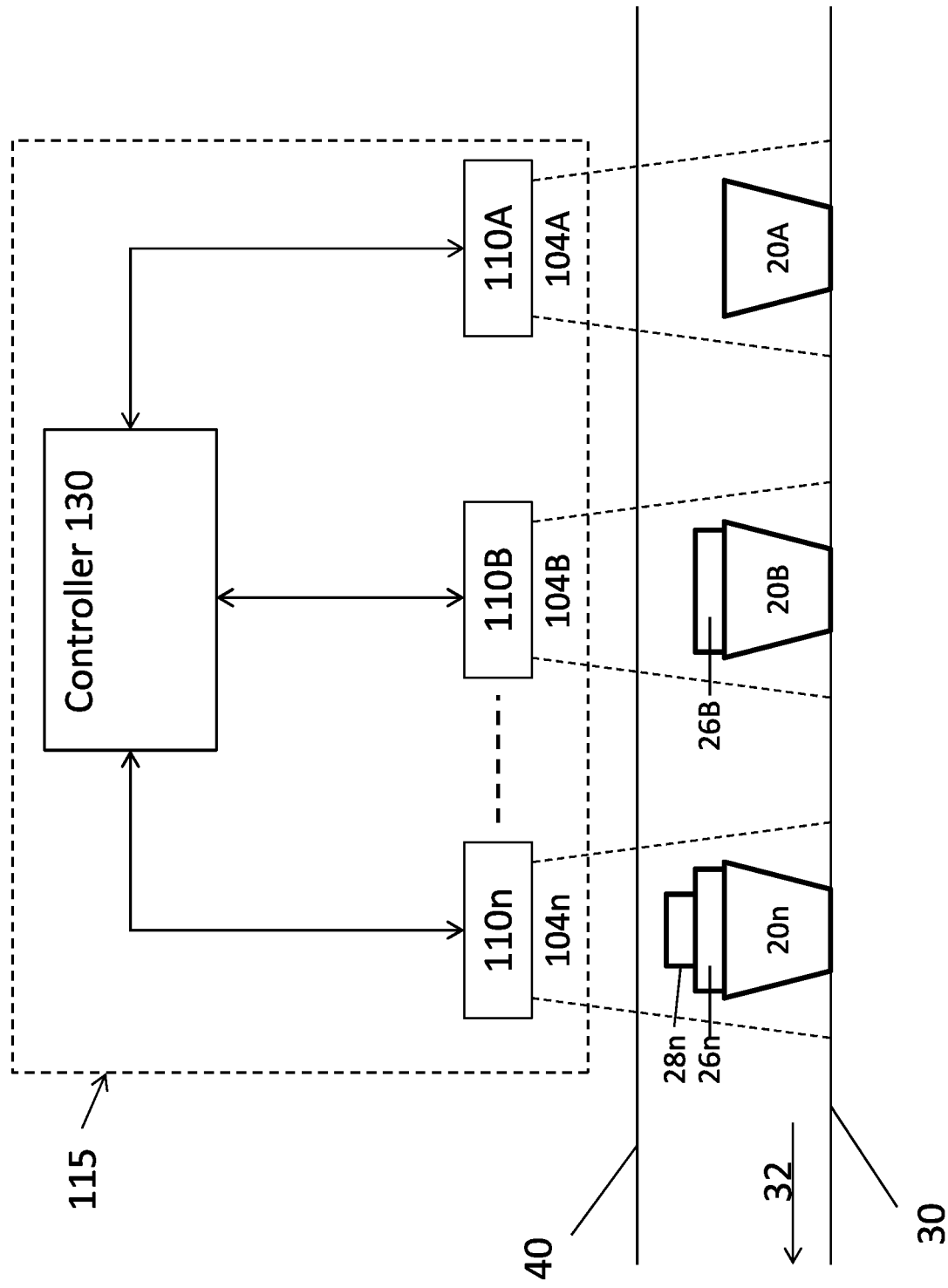
FIG. 5 is an illustrative schematic drawing showing a multi-inspection assembly automated visual inspection appliance on a production line according to at least some embodiments of the present disclosure.

Reference is now made to FIG. 5 which is an illustrative schematic drawing showing a multi-camera automated visual inspection appliance on a production line according to at least some embodiments of the present disclosure. As shown in FIG. 5, multiple inspection assemblies 110A, 110B and 110n are positioned where their respective fields of view 104A, 104B and 104n include respectively items 20A, 20B, and 20n to enable inspection of items 20A, 20B and 20n. In the embodiment of FIG. 5, items 20A, 20B, and 20n are stages in the production process of an item 20 where the production of item 20 includes the addition of parts 26 and 28 to item 20. Although the addition of parts 26 and 28 is illustrated in FIG. 5, this should not be considered limiting and the production process of item 20 may include any of additional parts, removal of parts or elements of item 20, or any other alteration to item 20 required as part of the production of item 20. In the non-limiting example illustrated in FIG. 5, item 20B is the same as item 20A but includes the addition of part 26. Item 20n is similarly the same as items 20A and 20B but includes the addition of parts 26 and 28.

Three inspection assemblies 110A, 110B, and 110n are shown for simultaneously imaging items 20A, 20B and 20n such that controller 130 simultaneously provides inspection results for each of items 20A, 20B and 20n and further controller 130 tracks the inspection progress of item 20 as it proceeds in the production process. Although three items 20A, 20B and 20n, and three inspection assemblies 110A, 110B and 110n are shown it should be appreciated that optionally any number of inspection assemblies 110 may be provided for simultaneous inspection of a corresponding number of different stages of item 20.

Figure 6A:
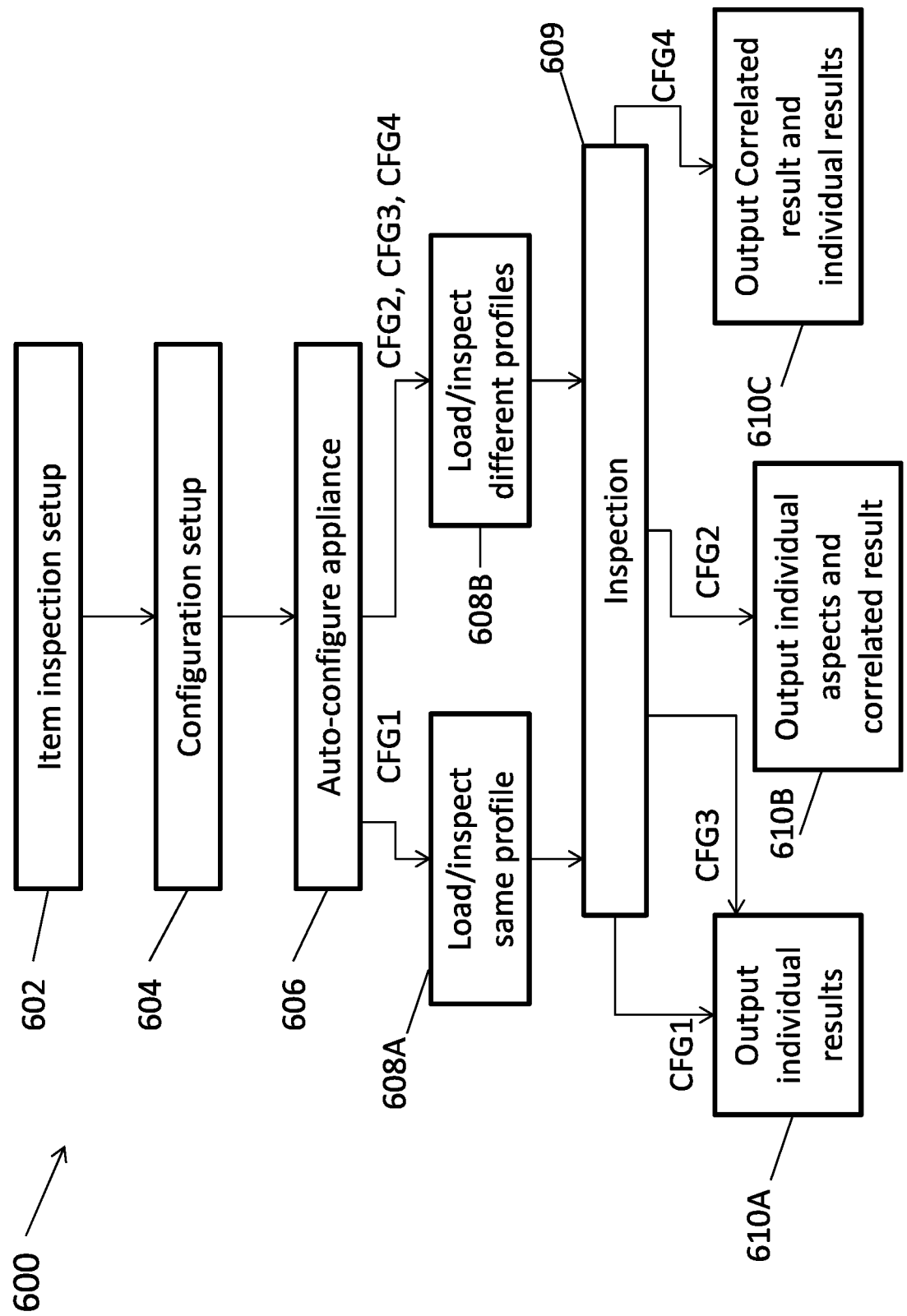
FIG. 6A is a flow diagram and FIG. 6B is an illustrative user interface showing a method for visual inspection of items on a production line using a multi-inspection assembly appliance according to at least some embodiments of the present disclosure.

Reference is now made to FIG. 6A which is a flow diagram 600 showing a method for visual inspection of items on a production line according to at least some embodiments of the present disclosure. System 115 requires a one-time setup step 602 for each item or aspect of item or stage of item that is to be inspected. In the setup step 602, at least two or more defect free samples of a manufactured item of the same type are placed in succession within field of view 104 of one of the cameras 102 of one of the inspection assemblies 110. Each defect free sample of the item is imaged by camera 102. These images, which may be referred to as setup images, are optionally obtained by using different imaging parameters of camera 102 and lighting parameters of light source 106. The images comprise image data such as pixel values that represent the intensity of reflected light as well partial or full images or videos.

The setup images are analyzed by controller 130 using machine learning/artificial intelligence (AI) and computer vision algorithms to create a complete representation of the item, for example, to collect information regarding possible 2D shapes and 3D characteristics of the item or to find uniquely discriminative features of the item and the spatial relation between these unique features. The analysis results in the creation of a profile 136 unique to the item, used for defect detection, gating, counting, sorting and/or other inspection tasks on the production line. Profile 136 describes the item and the setup of system 115 for inspecting the item and is stored in DB 134.

Figure 6B:
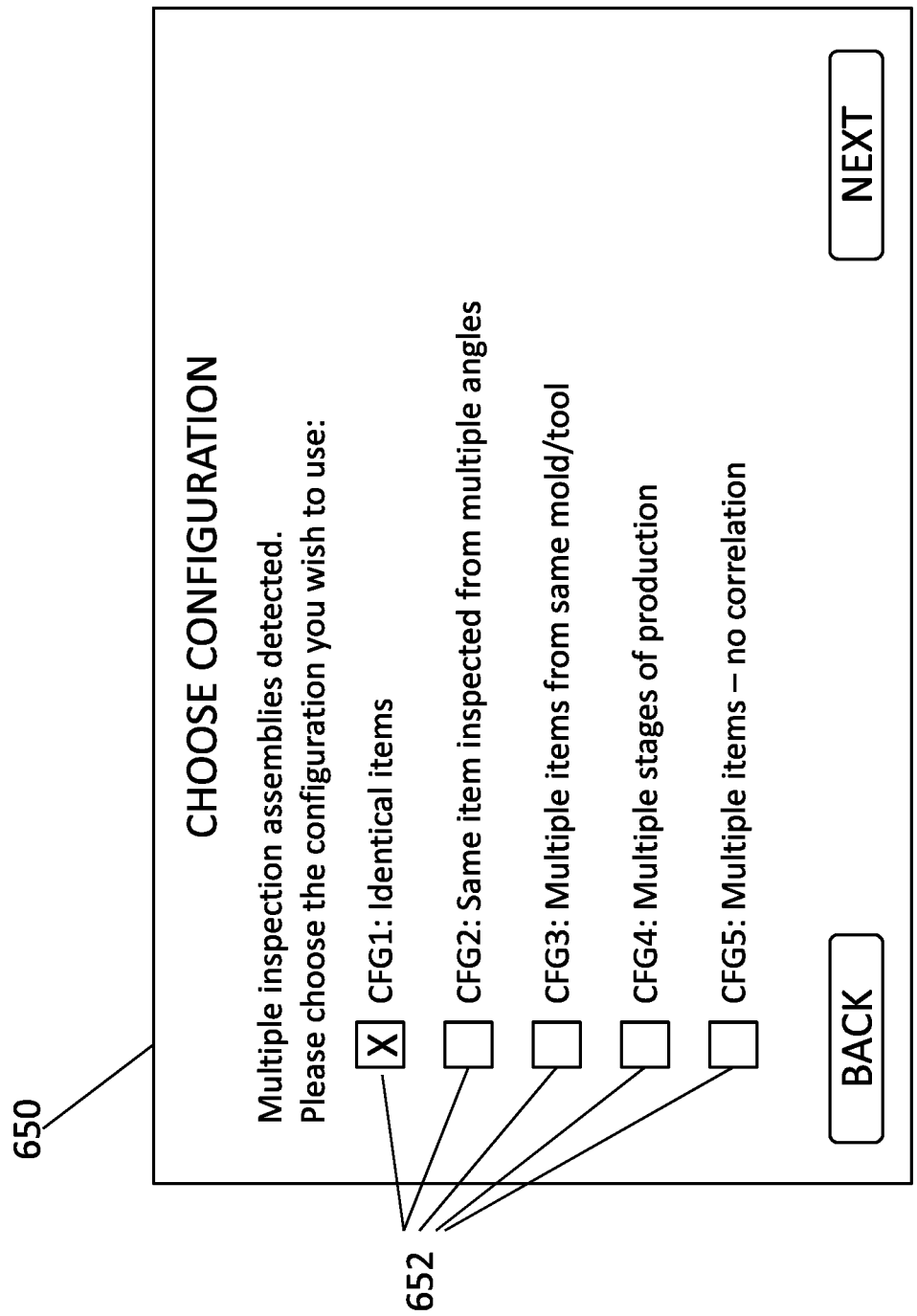

In step 604, typically performed only once as part of an initial setup, controller 130 identifies that more than one inspection assembly 110 is connected to controller 130. Controller 130 then gives a user the option, via UI 132 of controller 130, to define the configuration of the inspection assemblies 110. For simplicity, the inspection configurations described herein have been numbered as CFG1-CFG5. FIG. 6B shows an illustrative screen 650 from UI 132 where a user simply indicates via a checkbox 652 which configuration is to be used for system 115. Optionally a user can configure the action to be taken or notification to be provided by controller 130 in the event of finding a defect.

It should be appreciated that optionally any suitable number of inspection configurations may be implemented using system 115 and the list and numbering provided herein should not be considered limiting. A non-limiting list of possible inspections configurations includes:

CFG1: Inspecting multiple identical items simultaneously where each item is inspected using a separate inspection assembly 110 (e.g., as illustrated in FIG. 2);

CFG2: Inspecting the same item simultaneously from different points of view with multiple inspection assemblies 110 (e.g., as illustrated in FIG. 3);

CFG3: Inspecting multiple different items simultaneously where each item is inspected using a separate inspection assembly 110 (e.g., as illustrated in FIG. 4);

CFG4: Inspecting multiple stages of a production of an item using multiple inspection assemblies 110 (e.g., as illustrated in FIG. 5).

The choice of inspection configuration will affect how appliance or system 115 operates during inspection as described further below (step 610). Thus, in step 606 prior to commencing inspection, system 115 is automatically configured by controller 130 to provide inspection based on the inspection configuration in use. Aside from selecting the configuration using UI 132 in step 604, the configuration of step 606 does not need further planning or programing by a user of system 115 and it should be appreciated that automation of this step 606 enables very flexible and simple deployment of appliance 115 for multi-inspection appliance configurations.

In steps 608A and 608B, inspection of the items can commence with loading of the correct item profile 136 to be associated with each inspection assembly 110. Loading the item profile 136 includes configuring the inspection assemblies 110 and controller 130 based on configuration information contained in the profile 136. In step 608A, for CFG1, controller 130 loads a single item profile for use for inspecting multiple identical items using multiple inspection assemblies 110.

In step 608B for CFG2, CFG3, and CFG4, multiple profiles 136 are required:

For CFG2 each point of view of the single item that is inspected by a different inspection assembly 110 is represented by a different profile 136;

For CFG3 each type of item that is inspected by a different inspection assembly 110 is represented by a different profile 136; and For CFG4 each stage that is inspected by a different inspection assembly 110 is represented by a different profile 136.

In the inspection step 609, the items under inspection are imaged by cameras 102 of each inspection assembly 110. The images received from the inspection assemblies 110, which may be referred to as inspection images, are processed by controller 130 using machine learning/AI algorithms to detect defects or for gating, counting or sorting of items and/or other inspection tasks, based on the loaded profiles 136.

In steps 610A, B and C, controller 130 provides an output indicating the result of inspection step 609. UI 132 preferably provides notifications or indications regarding inspected items found to be free of defects or to contain defects. Exemplary methods of notification include but are not limited to visual indication, audio indication, or a combination of these. A visual indication might for example comprise a green (item defect-free) or red (item defective) rectangle surrounding the view of an item on UI 132 or a green or red flash of light, or a relevant icon presented on UI 132. UI 132 preferably shows all of the images currently captured from all of the inspection assemblies 110 including the inspection result. Optionally a user can select the current capture view for specific inspection assemblies 110 using UI 132.

Preferably every image of every item captured by the inspection assemblies 110 including the inspection output (decision) is stored in database 134. Preferably related inspection images are stored together or linked for easy retrieval of related images such as for CFG2 and CFG4. For example, for CFG2, all the images of an item taken from different angles are stored and linked together to enable a user viewing the image of a defective section of the item (as captured from one of the angles by one of the inspection assemblies) to easily view the other angles such as to determine if there is some correlation between the aspects of the defective item. Similarly for CFG4 all the images of an item taken at different stages of production are stored and linked together to enable a user viewing the image of a defective stage of the item (as captured by one of the inspection assemblies) to easily view the other stages such as to determine if there is some correlation between the stages of the defective item. Linking the images may optionally be performed by any suitable means such as but not limited to: a common serial number, a specific shared marking, saving in the same folder, and so forth.

Optionally the output of controller 130 comprises an action or signals to the production line that an action should be taken such as but not limited to marking a defective item or removing a defective item from the production line.

Depending on the inspection configuration, the output will be different, as follows:

In step 610A, for CFG1 and CFG3 individual outputs will be provided for each item inspected by each inspection assembly 110;

In step 610B, for CFG2 individual outputs will be provided for each aspect of the inspected item as imaged by each inspection assembly 110 and a correlated result for the item may be provided summarizing the results from all of the inspection assemblies 110;

In step 610C, for CFG4 individual outputs will be provided for each stage of the item inspected as imaged by each inspection assembly 110 and a correlated result for each item that has progressed through multiple stages of assembly may be provided summarizing the results from all of the inspection assemblies 110 that image the item as it was manufactured.

Following completion of inspection, appliance or system 115 indicates readiness to inspect the subsequent items. A non-limiting example of a visual indication of readiness comprises a grey rectangle surrounding the view of the item on UI 132.

Reference is now made to FIGS. 7A-7E which are illustrative schematic drawings showing a multi-camera automated visual inspection appliance on a production line according to at least some embodiments of the present disclosure. The embodiments of FIGS. 7A-7E are similar to that of FIG. 3, but where inspection assemblies 110 are positioned where the respective fields of view 104 capture overlapping aspects or adjoining aspects of item 25.

Figure 7A:
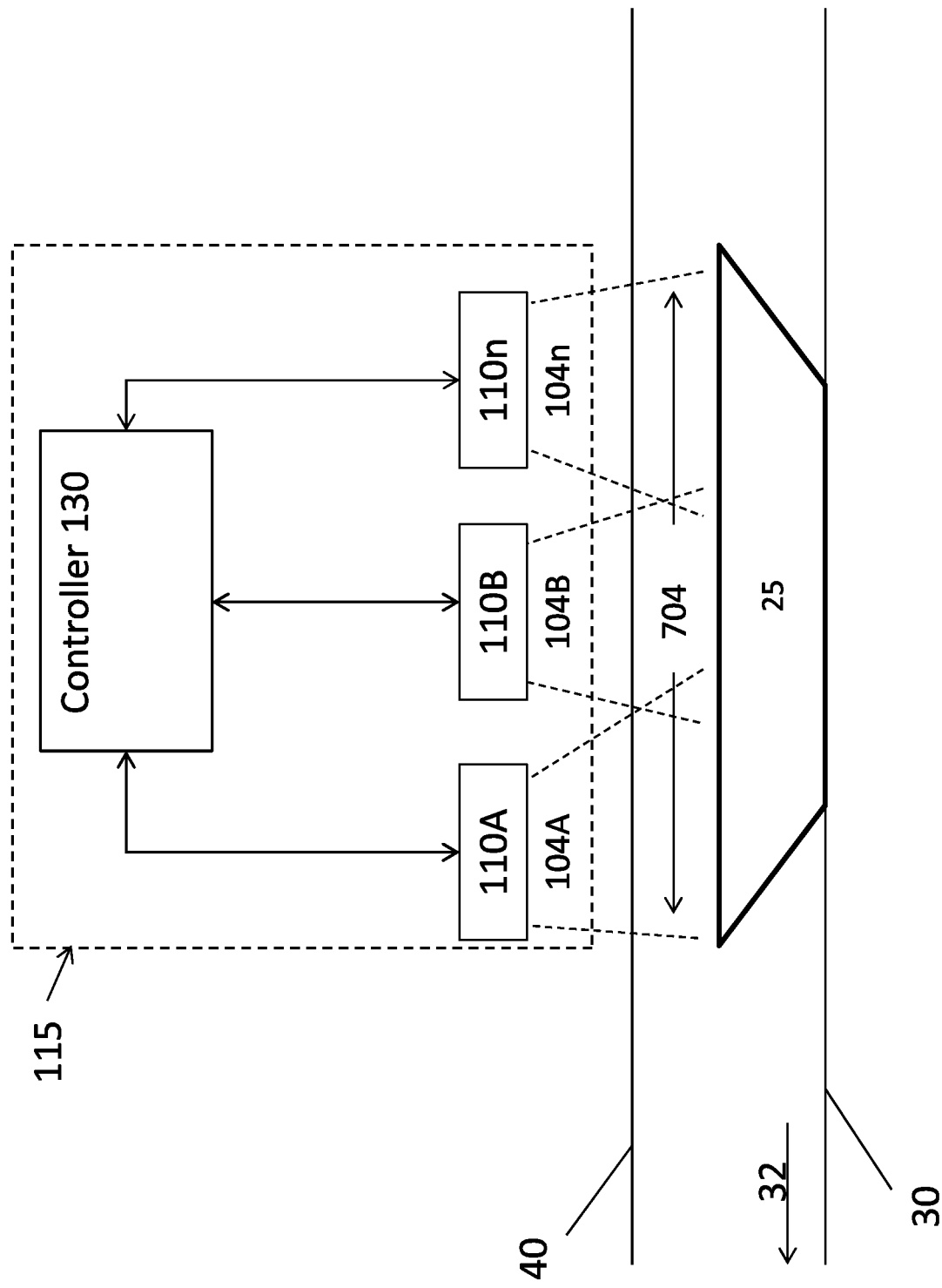
FIGS. 7A-7F are illustrative schematic drawings showing a multi-camera automated visual inspection appliance on a production line according to at least some embodiments of the present disclosure.

In FIG. 7A three inspection assemblies 110A, 110B, and 110n are shown for simultaneously imaging overlapping or adjoining aspects of item 25 such that controller 130 can combine the images provided from FOVs 104A, 104B, and 104n of each inspection assembly into a single FOV 704 to provide a single inspection result for item 25. Although three inspection assemblies 110A, 110B and 110n are shown it should be appreciated that optionally any number of inspection assemblies 110 may be provided for inspection of a corresponding number of different aspects of item 25.

Figure 7B:
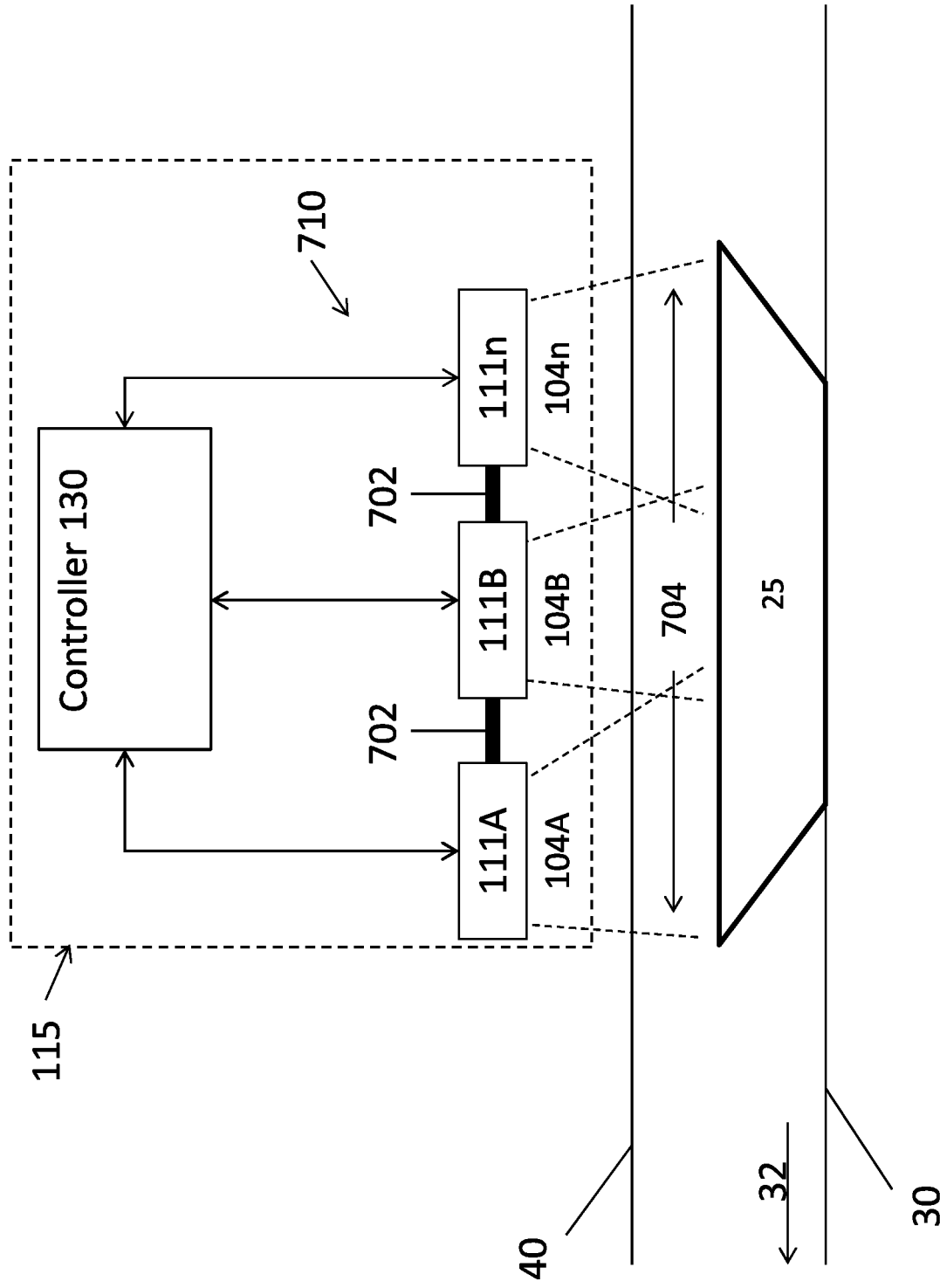
Figure 7C:
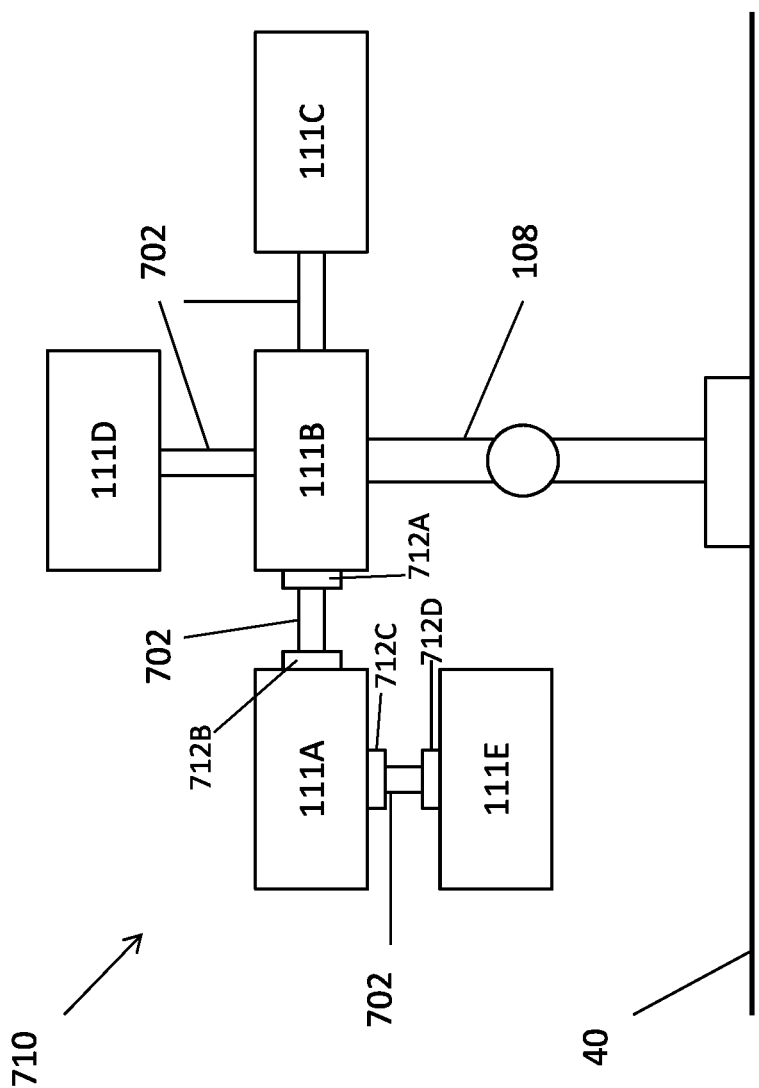

FIGS. 7B and 7C show an alternative embodiment of the configuration of FIG. 7A where inspection assembly 710 comprises a single mounting arm 108 supporting multiple camera assemblies 111. In FIG. 7B three camera assemblies 111A, 111B, and 111n are shown for simultaneously imaging overlapping or adjoining aspects of item 25 such that controller 130 can combine the images provided from FOVs 104A, 104B, and 104n of each inspection assembly into a single FOV 704 to provide a single inspection result for item 25. Camera assemblies 111A, 111B, and 111n are joined together by connector arms 702. In a further example of FIG. 7C, inspection assembly 710 comprises a single mounting arm 108 supporting five camera assemblies (111A-111E) which are joined using connector arms 702. It should be appreciated that any reasonable number of camera assemblies 111 can be mounted in such an inspection assembly 710 based, for example, on the weight of the camera assemblies 111 and the stability of the inspection assembly 710.

Optionally, connector arms 702 comprise sensors 712A-D that can detect the relative positions and angles of attached camera assemblies 111 for providing the detected positions and angles to controller 130 to guide controller 130 to automatically combine the images provided from the FOVs 104 of each camera assembly. Combined images are presented via UI 132 to users with the same functionality as that provided using non-combined images as illustrated in the descriptions below of FIGS. 7D-7F.

In the non-limiting example of FIG. 7C, sensors 712A and 712B detect that camera assemblies 111B and 111A are positioned at the same height but are spaced horizontally apart. Sensors 712A and 712B are further adapted to detect the relative angles of mounting and the distance between camera assemblies 111B and 111A. Further, camera assembly 111A is mounted to the right (as viewed from above) of camera assembly 111B. This relative positioning data provided to controller 130 by sensors 712A and 712B guides controller 130 to position the captured images from camera assemblies 111B and 111A side by side on UI 132, where the image from camera assembly 111A is to the right of the image from camera assembly 111B. The images are further adjusted based on the distance and relative angle of mounting. Captured images are either stitched together or shown separately as described further below.

Similarly, sensors 712C and 712D detect that camera assemblies 111A and 111E are positioned at different heights (where assembly 111E is lower than 111A) but are positioned in the same vertical plane. Sensors 712C and 712D are further adapted to detect the relative angles of mounting and the distance between camera assemblies 111A and 111E. This relative positioning data provided to controller 130 by sensors 712C and 712D guides controller 130 to position the captured images from camera assemblies 111A and 111E one above the other on UI 132, where the image from camera assembly 111A is above the image from camera assembly 111E. The images are further adjusted based on the distance and relative angle of mounting. Captured images are either stitched together or shown separately as described further below.

Figure 7D:
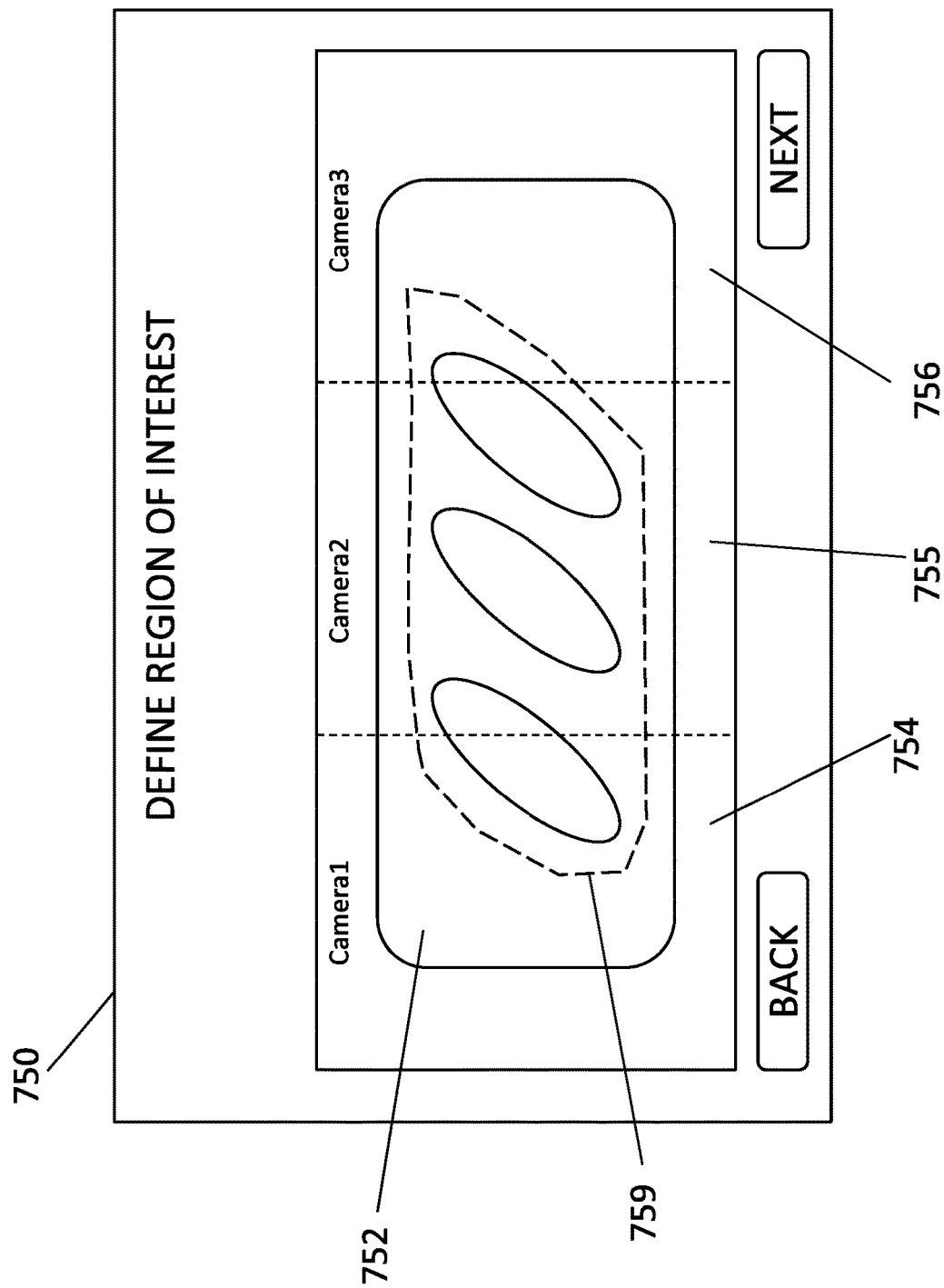
Figure 7E:
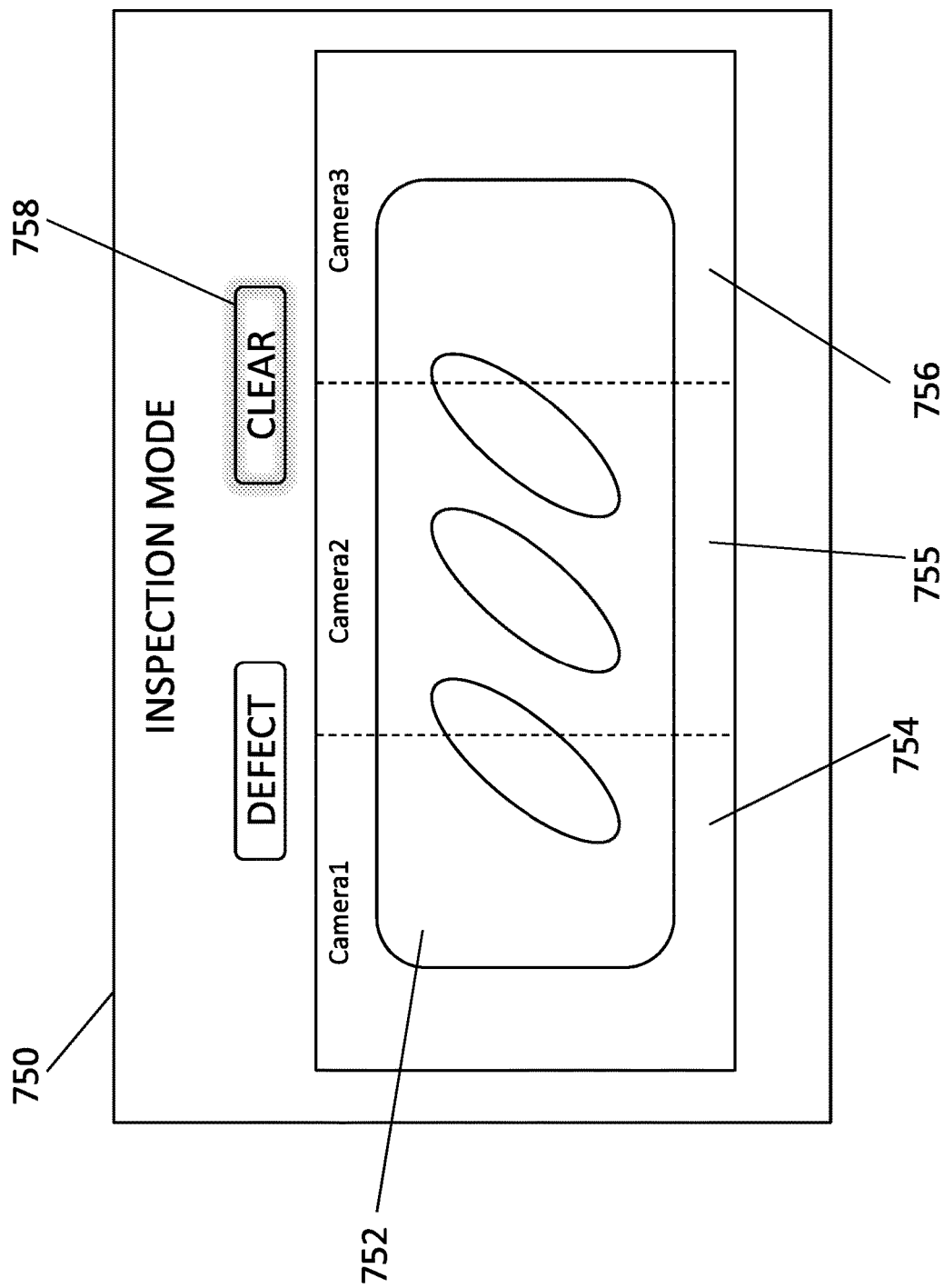

FIGS. 7D and 7E show illustrative screenshots 750 from UI 132 of controller 130 for the embodiments of FIGS. 7A-7C. As shown, the three captured views 754, 755 and 756 respectively of inspection assemblies 110A, 110B and 110n are seamlessly joined ("stitched") together to present a single view 752 of item 25. The stitching process may include adjusting the camera and lighting settings for each received image such as but not limited to zoom so as to match up the received images. The screenshot 750 of FIG. 7D illustrates definition of the region of interest 759 for inspection performed on the combined image of item 25, where the inspection algorithm is actually performed on the separate images, thereby easing the inspection setup process for users. The screenshot of FIG. 7E illustrates inspection mode for item 25 where indicator 758 shows that the item inspected is clear of defects.

Figure 7F:
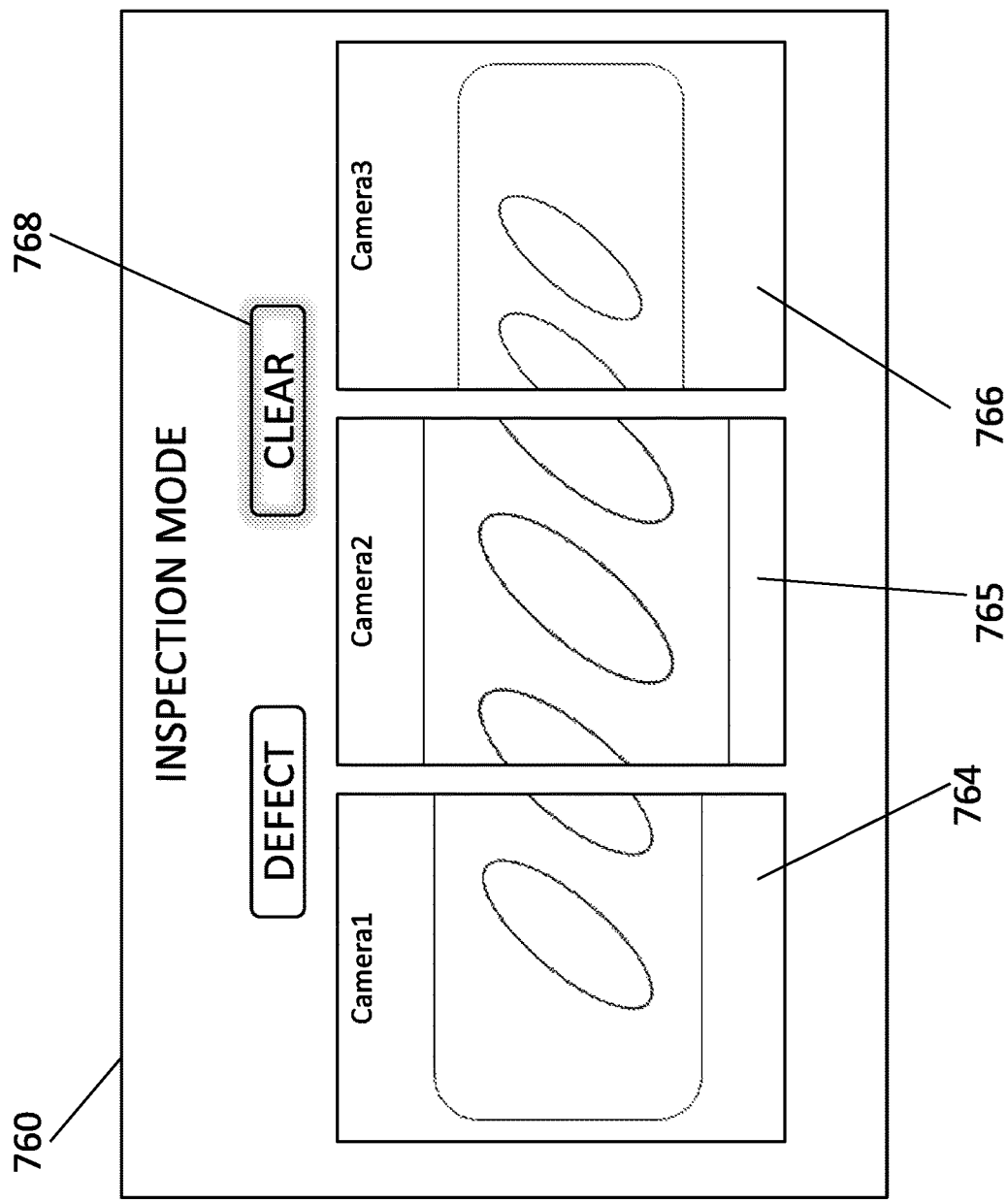

Alternatively, FIG. 7F shows an illustrative screenshot 760 from UI 132 of controller 130 for the embodiments of FIGS. 7A-7C. As shown, the three captured views 764, 765 and 766 respectively of inspection assemblies 110A, 110B and 110n are shown separately each showing the respective view captured of item 25. Screenshot 760 illustrates inspection mode for item 25 where indicator 768 shows that the item inspected is clear of defects based on all three captured views.

Figure 8:
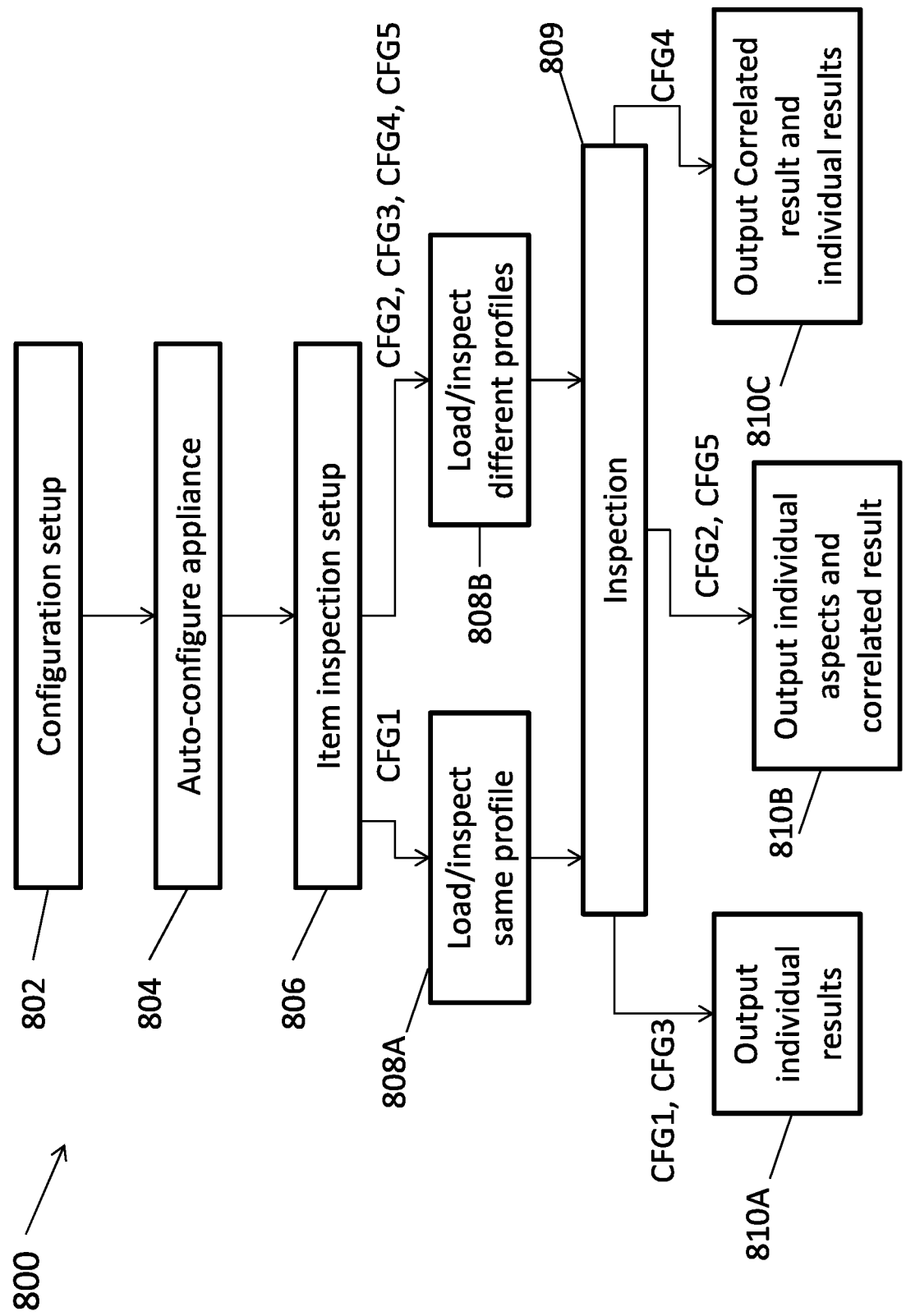
FIG. 8 which is a flow diagram showing a method for visual inspection of items on a production line according to at least some embodiments of the present disclosure.

Reference is now made to FIG. 8 which is a flow diagram showing a method for visual inspection of items on a production line according to at least some embodiments of the present disclosure. Process 800 includes the embodiments of FIGS. 7A-7C. In step 802 performed typically only once as part of an initial setup, controller 130 identifies that more than one inspection assembly 110 or camera assembly 111 is connected to controller 130. Controller 130 then gives a user the option, via UI 132 of controller 130, to define the configuration of the inspection assemblies 110 or camera assemblies 111.

For simplicity, the inspection configurations described herein have been numbered as CFG1-CFG5. It should be appreciated that optionally any suitable number of inspection configurations may be implemented and the list and numbering provided herein should not be considered limiting. A non-limiting list of possible inspections configurations includes:

CFG1: Inspecting multiple identical items simultaneously where each item is inspected using a separate inspection assembly 110 (e.g., as illustrated in FIG. 2);

CFG2: Inspecting the same item simultaneously from different points of view with multiple inspection assemblies 110 (e.g., as illustrated in FIG. 3);

CFG3: Inspecting multiple different items simultaneously where each item is inspected using a separate inspection assembly 110 (e.g., as illustrated in FIG. 4);

CFG4: Inspecting multiple stages of a production of an item using multiple inspection assemblies 110 (e.g., as illustrated in FIG. 5);

CFG5: Inspecting the same item simultaneously from overlapping or adjoining points of view with multiple inspection assemblies 110 or multiple camera assemblies 111 (e.g., as illustrated in FIGS. 7A-7C).

The choice of inspection configuration will affect how system 115 operates during inspection as described further below (steps 810). Thus, in step 804 prior to commencing inspection, system 115 is automatically configured by controller 130 to provide inspection based on the inspection configuration in use. Aside from selecting the configuration using UI 132 in step 802, the configuration of step 804 does not need further planning or programing by a user of system 115 and it should be appreciated that automation of this step 804 enables very flexible and simple deployment of system 115 for multi-inspection appliance configurations.

System 115 typically requires a one-time setup step 806 for each item or aspect of item or stage of item that is to be inspected. In the setup step 806, at least two or more defect free samples of a manufactured item of the same type are placed in succession within field of view 104 or the combined field of view 704 of the inspection assemblies 110 or camera assemblies 111 that will inspect the particular item or aspect. Each defect free sample of the item is imaged by camera 102 of the particular inspection assembly 110 or camera assembly 111. These images, which may be referred to as setup images, are optionally obtained by using different imaging parameters of camera 102 and lighting parameters of light source 106. The images comprise image data such as pixel values that represent the intensity of reflected light as well partial or full images or videos.

The setup images are analyzed by controller 130 using machine learning/artificial intelligence (AI) and computer vision algorithms to create a complete representation of the item, for example, to collect information regarding possible 2D shapes and 3D characteristics of the item or to find uniquely discriminative features of the item and the spatial relation between these unique features. The analysis results in the creation of a profile 136 unique to the item, used for defect detection, gating, counting, or sorting and/or other inspection tasks on the production line. Profile 136 describes the item and the setup of system 115 for inspecting the item and is stored in DB 134.

In steps 808A-B, inspection of the item/s can commence with loading of the correct item profile 136 to be associated with each inspection assembly 110. Loading the item profile 136 includes configuring the inspection assemblies 110 and controller 130 based on configuration information contained in the profile 136. In step 808A, for CFG1, controller 130 loads a single item profile for use for inspecting multiple identical items using multiple inspection assemblies 110.

In step 808B, for CFG2, CFG3, CFG4, and CFG5, multiple profiles 136 are required:

For CFG2 each point of view of the single item that is inspected by a different inspection assembly 110 is represented by a different profile 136;

For CFG3 each type of item that is inspected by a different inspection assembly 110 is represented by a different profile 136;

For CFG4 each stage that is inspected by a different inspection assembly 110 is represented by a different profile 136;

For CFG5 each point of view of the single item that is inspected by a different inspection assembly 110 or camera assembly 111 is represented by a different profile 136.

In the inspection step 809, the items under inspection are imaged by cameras 102 of each inspection assembly 110 or camera assembly 111. The images received from the inspection assemblies 110 or camera assembly 111, which may be referred to as inspection images, are processed by controller 130 using machine learning/AI algorithms to detect defects or for gating, counting or sorting of items and/or other inspection tasks based on the loaded profiles 136.

In steps 810A-C, controller 130 provides an output indicating the result of inspection step 809. UI 132 preferably provides notifications or indications regarding inspected items found to be free of defects or to contain defects. Exemplary methods of notification include but are not limited to visual indication, audio indication, or a combination of these. A visual indication might for example comprise a green (item defect-free) or red (item defective) rectangle surrounding the view of an item on UI 132 or a green or red flash of light, or a relevant icon presented on UI 132. UI 132 preferably shows all of the images currently captured from all of the inspection assemblies 110 including the inspection result. Optionally, a user can select the current capture view for specific inspection assemblies 110 using UI 132.

Preferably every image of every item captured by the inspection assemblies 110 including the inspection output (decision) is stored in database 134. Preferably related inspection images are stored together or linked for easy retrieval of related images such as for CFG2, CFG4 and CFG5. For example, for CFG5, a stitched together image of an item taken from multiple camera assemblies is stored to enable a user viewing the image of a defective section of the item (as captured from one of the inspection assemblies) to easily view the entire item such as to determine if there is some correlation between the aspects of the defective item. Similarly for CFG4 all the images of an item taken at different stages of production are stored and linked together to enable a user viewing the image of a defective stage of the item (as captured by one of the inspection assemblies) to easily view the other stages such as to determine if there is some correlation between the stages of the defective item. Linking the images may optionally be performed by any suitable means such as but not limited to: a common serial number, a specific shared marking, saving in the same folder, and so forth.

Optionally the output of controller 130 comprises an action or signals to the production line that an action should be taken such as but not limited to marking a defective item or removing a defective item from the production line.

Depending on the inspection configuration, the output will be different as follows:

In step 810A, for CFG1 and CFG3 individual outputs will be provided for each item inspected by each inspection assembly 110;

In step 810B for CFG2 and CFG5 individual outputs will be provided for each aspect of the inspected item as imaged by each inspection assembly 110 or camera assembly 111 and a correlated result for the item may be provided summarizing the results from all of the inspection assemblies 110 or camera assemblies 111;

In step 810C for CFG4 individual outputs will be provided for each stage of the item inspected as imaged by each inspection assembly 110 and a correlated result for each item that has progressed through multiple stages of assembly may be provided summarizing the results from all of the inspection assemblies 110 that images the item as it was manufactured.

Following completion of inspection, system 115 indicates readiness to inspect the subsequent items. A non-limiting example of a visual indication of readiness comprises a grey rectangle surrounding the view of the item on UI 132.

It is appreciated that certain features of the disclosure, which are, for clarity, described in the context of separate embodiments, may also be provided in combination in a single embodiment. Conversely, various features of the disclosure, which are, for brevity, described in the context of a single embodiment, may also be provided separately or in any suitable sub-combination.

Although the disclosure has been described in conjunction with specific embodiments thereof, it is evident that many alternatives, modifications and variations will be apparent to those skilled in the art. Accordingly, it is intended to embrace all such alternatives, modifications and variations that fall within the spirit and broad scope of the appended claims.

The invention claimed is:

1. An appliance for automated visual inspection of at least two items, the appliance comprising:
   a. at least two inspection assemblies each comprising a camera assembly, the inspection assemblies configured to inspect the two items;
   b. a controller in data communication with said at least two inspection assemblies, the controller configured to accept input describing a relationship between the two items and to automatically load item profiles for inspection of the two items based on the relationship; and
   c. a user interface (UI), wherein said UI provides a list of relationships and the input is input by selecting a relationship from said list via a selection mechanism,
   wherein the relationship between the two items is at least one of:
      i) said two items are identical and produced concurrently,
      ii) said two items are different aspects of a same item,
      iii) said two items are different from each other but are part of a same production process,
      iv) said two items are different stages in manufacture of an item, or
      v) said two items are different and produced concurrently.

2. The appliance of claim 1 wherein the selection mechanism is chosen from a group consisting of:
   a. selecting from a drop-down list of relationships;
   b. checking a check box next to one of said relationships; and
   c. selecting a button from a list of buttons wherein each button represents one of said relationships.

3. The appliance of claim 1 wherein when the two items are identical, the controller automatically loads a single item profile and provides individual results for each item.

4. The appliance of claim 1 wherein when the two items are different aspects of a same item, the controller automatically loads item profiles for each aspect and provides both of individual results for each item and a correlated result for all items.

5. The appliance of claim 1 wherein when the two items are different from each other but are produced as part of a same production process, the controller automatically loads multiple item profile each corresponding to an item and provides individual results for each item.

6. The appliance of claim 1 wherein when the two items are different stages in the manufacture of an item, the controller automatically loads item profiles for each stage and provides both of individual results for each item and a correlated result for all stages of an item.

7. The appliance of claim 1 wherein when the two items are different, the controller automatically loads item profiles for each item and provides individual results for each item.

8. The appliance of claim 7 wherein images related to the individual results for each item are stored and linked so as to be retrievable as a correlated set of images.

9. The appliance of claim 1 wherein the item profiles comprise parameters of the items as captured in images by one or more of the camera assemblies.

10. The appliance of claim 1 wherein each inspection assembly comprises a mounting arm and wherein at least two camera assemblies are mounted on a single mounting arm.

11. The appliance of claim 10 wherein each one of said at least two camera assemblies captures adjacent or overlapping fields of view of the items.

12. An appliance for automated visual inspection of at least two items, the appliance comprising:
   a. at least two inspection assemblies each comprising a camera assembly, the inspection assemblies configured to inspect the two items;
   b. a controller in data communication with said at least two inspection assemblies, the controller configured to accept input describing a relationship between the two items and to automatically load item profiles for inspection of the two items based on the relationship,
   wherein each inspection assembly comprises a mounting arm and wherein at least two camera assemblies are mounted on a single mounting arm, and
   wherein each one of said at least two camera assemblies captures adjacent or overlapping fields of view of the items, the appliance further comprising sensors mounted between said camera assemblies, wherein said sensors are adapted to detect the positions and angles between said camera assemblies relative to one another and for outputting said detected positions and angles to said controller.

13. The appliance of claim 12 wherein said controller comprises a UI and said controller is adapted to use said detected positions and angles to guide positioning of the captured fields of view based on the relative positions of said camera assemblies for display on said UI.

14. The appliance of claim 12 wherein said controller is adapted for using said detected positions and angles to guide the stitching together of the captured fields of view into a single combined field of view based on the relative positions of said camera assemblies, for display on said UI.

* * * * *